(12) United States Patent
Fujino

(10) Patent No.: US 11,975,557 B2
(45) Date of Patent: May 7, 2024

(54) IDENTIFICATION MEDIUM, AUTHENTICITY DETERMINATION METHOD, AND ARTICLE

(71) Applicant: ZEON CORPORATION, Tokyo (JP)

(72) Inventor: Yasuhide Fujino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 732 days.

(21) Appl. No.: 17/252,275

(22) PCT Filed: Jun. 18, 2019

(86) PCT No.: PCT/JP2019/024162
§ 371 (c)(1),
(2) Date: Dec. 15, 2020

(87) PCT Pub. No.: WO2020/004155
PCT Pub. Date: Jan. 2, 2020

(65) Prior Publication Data
US 2021/0300105 A1     Sep. 30, 2021

(30) Foreign Application Priority Data
Jun. 29, 2018  (JP) .................................. 2018-125357

(51) Int. Cl.
*B42D 25/351*  (2014.01)
*B42D 25/364*  (2014.01)
(Continued)

(52) U.S. Cl.
CPC ......... *B42D 25/351* (2014.10); *B42D 25/364* (2014.10); *B42D 25/391* (2014.10);
(Continued)

(58) Field of Classification Search
CPC .. G02B 5/3016; G02B 5/3025; G02B 5/3041; G02B 5/3083; G02B 27/283;
(Continued)

(56) References Cited

U.S. PATENT DOCUMENTS 6,217,792 B1   4/2001  Parri et al.
6,468,444 B1  10/2002  Meyer et al.
(Continued)

FOREIGN PATENT DOCUMENTS

EP   2687879 A1   1/2014
JP   H0672962 A   3/1994
(Continued)

OTHER PUBLICATIONS

Sep. 17, 2019, International Search Report issued in the International Patent Application No. PCT/JP2019/024162.
(Continued)

*Primary Examiner* — Stephone B Allen
*Assistant Examiner* — Jyotsna V Dabbi
(74) *Attorney, Agent, or Firm* — KENJA IP LAW PC

(57) ABSTRACT

An identification medium includes a first layer, and a second layer disposed thereon in a manner of overlapping with the first layer. The first layer is capable of reflecting one of clockwise circular polarized light and counterclockwise circular polarized light and allowing to pass therethrough the remaining circular polarized light. The second layer is capable of reflecting at least a portion of circular polarized light having the same rotation direction as that of the circular polarized light that the first layer reflects, and allowing to pass therethrough circular polarized light having an opposite rotation direction to that of the circular polarized light reflected by the first layer. A ratio ($Ssf_2/S_2$) of $Ssf_2$ defined by the following formula (2) relative to $S_2$ defined by the following formula (1) is more than 0.7:

(Continued)

$$S_2 = \int_{400}^{780} \{(Rf_2(\lambda)) * (Rf_2(\lambda))\}^{\wedge}(1/2) * d\lambda \qquad (1)$$

$$Ssf_2 = \int_{400}^{780} \{(Rs(\lambda)) * (Rf_2(\lambda))\}^{\wedge}(1/2) * d\lambda \qquad (2)$$

10 Claims, 12 Drawing Sheets

(51) Int. Cl.
    *B42D 25/391*     (2014.01)
    *B42D 25/45*     (2014.01)
    *G02B 5/30*     (2006.01)
    *G07D 7/00*     (2016.01)
    *G07D 7/1205*     (2016.01)
    *G02B 27/28*     (2006.01)

(52) U.S. Cl.
    CPC .......... *B42D 25/45* (2014.10); *G02B 5/3025* (2013.01); *G02B 5/3041* (2013.01); *G02B 5/3083* (2013.01); *G07D 7/003* (2017.05); *G07D 7/1205* (2017.05); *G02B 5/3016* (2013.01); *G02B 27/283* (2013.01)

(58) Field of Classification Search
    CPC .. G02B 27/286; B42D 25/351; B42D 25/364; B42D 25/391; B42D 25/45; G07D 7/1205; G07D 7/003
    USPC .................................................... 359/485.01
    See application file for complete search history.

(56) References Cited

U.S. PATENT DOCUMENTS

| | | |
|---|---|---|
| 6,879,362 B2 | 4/2005 | Kawabata |
| 8,236,318 B2 | 8/2012 | Keler et al. |
| 8,362,214 B2 | 1/2013 | Keler et al. |
| 8,586,720 B2 | 11/2013 | Keler et al. |
| 9,298,036 B2 * | 3/2016 | Hoshino ................ B42D 25/47 |
| 2004/0252373 A1 * | 12/2004 | Umeya .................. G03B 21/60 359/449 |
| 2012/0262767 A1 | 10/2012 | Ida |
| 2013/0341903 A1 * | 12/2013 | Ochiai ..................... B41M 3/14 283/85 |
| 2014/0022493 A1 | 1/2014 | Hoshino et al. |
| 2018/0201045 A1 * | 7/2018 | Quintana Arregui ........................ B42D 25/328 |

FOREIGN PATENT DOCUMENTS

| | | |
|---|---|---|
| JP | 2000290315 A | 10/2000 |
| JP | 2003066214 A | 3/2003 |
| JP | 2003313187 A | 11/2003 |
| JP | 2003342219 A | 12/2003 |
| JP | 2004115414 A | 4/2004 |
| JP | 2005289881 A | 10/2005 |
| JP | 2007171310 A | 7/2007 |
| JP | 2007176870 A | 7/2007 |
| JP | 2010134333 A | 6/2010 |
| JP | 2010196005 A | 9/2010 |
| JP | 2012198316 A | 10/2012 |
| JP | 2014174472 A | 9/2014 |
| JP | 6065667 B2 | 1/2017 |
| JP | 6067667 B2 | 1/2017 |
| JP | 6142714 B2 | 6/2017 |
| WO | 9800428 A1 | 1/1998 |
| WO | 2012118013 A1 | 9/2012 |
| WO | WO-2017009494 A1 * | 1/2017 .............. B41M 3/14 |

OTHER PUBLICATIONS

Feb. 25, 2022, the Extended European Search Report issued by the European Patent Office in the corresponding European Patent Application No. 19825585.3.

Dec. 29, 2020, International Preliminary Report on Patentability issued in the International Patent Application No. PCT/JP2019/024162.

* cited by examiner

IDENTIFICATION MEDIUM, AUTHENTICITY DETERMINATION METHOD, AND ARTICLE

FIELD

The present invention relates to an identification medium, a method for determining authenticity of an identification medium, and an article including an identification medium.

BACKGROUND

It is an ordinary practice to furnish an article with an identification medium which cannot be easily reproduced for determination whether or not the article is an authentic product supplied from a registered manufacturer. As such an identification medium, there is known an identification medium containing a material having a circular polarized light separation function (for example, see Patent Literature 1).

The identification medium described in Patent Literature 1 includes: a light reflection layer that is capable of reflecting one of clockwise circular polarized light and counterclockwise circular polarized light and allowing to pass therethrough the remaining circular polarized light; and a depolarizing absorption layer that is disposed on the light reflection layer in a manner of overlapping therewith and that has a specific average transmittance.

CITATION LIST

Patent Literature

Patent Literature 1: Japanese Patent No. 6065667 B

SUMMARY

Technical Problem

A material having a circular polarized light separation function has a function of allowing to pass therethrough one of clockwise circular polarized light and counterclockwise circular polarized light, and of reflecting a portion or the entirety of the other circular polarized light. Observation of an identification medium containing such a material through a clockwise circular polarizing plate and observation of the identification medium through a counterclockwise circular polarizing plate result in different observation image. Therefore, the authenticity of an article including such an identification medium is generally determined using a viewer including two circular polarizing plates: a clockwise circular polarizing plate and a counterclockwise circular polarizing plate.

Since the aforementioned viewer including two circular polarizing plates is necessary for the determination of authenticity with the known identification medium, the cost therefor was high. Furthermore, since it is difficult for ordinary users to acquire the viewer, it is difficult for such users to determine authenticity. Accordingly, the determination of authenticity has been performed only by those such as a registered manufacturer, a certain retail store, and a public institution. Therefore, there has been a demand for an identification medium with which authenticity can be determined without using the aforementioned special viewer.

The present invention has been devised in view of the aforementioned problem and has its object to provide an identification medium with which authenticity can be determined without using a special viewer, a method for determining authenticity of the identification medium, and an article including the identification medium.

Solution to Problem

The present inventor intensively conducted research for solving the aforementioned problem. As a result, the present inventor has found that an identification medium with which authenticity can be determined by the naked eye can be provided when, in an identification medium including a first layer that is capable of reflecting one type of circular polarized light and allowing to pass therethrough the remaining circular polarized light and a second layer disposed in a manner of overlapping with the first layer, the second layer being capable of reflecting circular polarized light having the same rotation direction as that of the circular polarized light that the first layer reflects and being capable of allowing to pass therethrough circular polarized light having the opposite rotation direction to that of the circular polarized light that the first layer reflects, a reflection ratio of the first layer and a reflection ratio of the second layer satisfy a specific relationship. Thus, the present invention has been accomplished.

That is, the present invention is as follows.

<1> An identification medium comprising a first layer, and a second layer disposed thereon in a manner of overlapping with the first layer, wherein
  the first layer is a layer that is capable of reflecting one of clockwise circular polarized light and counterclockwise circular polarized light and allowing to pass therethrough the remaining circular polarized light,
  the second layer is a layer that is capable of reflecting at least a portion of circular polarized light having the same rotation direction as that of the circular polarized light that the first layer reflects, and allowing to pass therethrough circular polarized light having an opposite rotation direction to that of the circular polarized light reflected by the first layer, and
  a ratio ($Ssf_2/S_2$) of $Ssf_2$ defined by the following formula (2) relative to $S_2$ defined by the following formula (1) is more than 0.7:

$$S_2 = \int_{400}^{780} \{(Rf_2(\lambda)) * (Rf_2(\lambda))\}^\wedge(1/2) * d\lambda \quad (1)$$

(in the formula, $\lambda$ represents a wavelength (nm), and $Rf_2(\lambda)$ represents a reflection ratio at a wavelength $\lambda$ of the second layer)

$$Ssf_2 = \int_{400}^{780} \{(Rs(\lambda)) * (Rf_2(\lambda))\}^\wedge(1/2) * d\lambda \quad (2)$$

(in the formula, $Rs(\lambda)$ represents a reflection ratio at a wavelength $\lambda$ of the first layer).

<2> The identification medium according to <1>, wherein
  the first layer is a layer of a resin having cholesteric regularity,
  the second layer contains a flake of a resin having cholesteric regularity, and
  the identification medium is transparent or translucent.

<3> The identification medium according to <1> or <2>, comprising a third layer disposed on the first layer on a surface opposite to a surface on which the second layer is disposed, such that the third layer overlaps with the first layer, the third layer is a layer that is capable of allowing to pass therethrough circular polarized light having an opposite rotation direction to that of the circular polarized light that the first layer reflects, and that contains a flake of a resin having cholesteric regularity.

<4> The identification medium according to <3>, wherein a ratio (Ssf$_3$/S$_3$) of Ssf$_3$ defined by the following formula (4) relative to S$_3$ defined by the following formula (3) is more than 0.7:

$$S_3 = \int_{400}^{780} \{(Rf_3(\lambda))*(Rf_3(\lambda))\}^{\wedge}(1/2)*d\lambda \quad (3)$$

(in the formula, Rf$_3$($\lambda$) represents a reflection ratio at a wavelength $\lambda$ of the third layer)

$$Ssf_3 = \int_{400}^{780} \{(Rs(\lambda))*(Rf_3(\lambda))\}^{\wedge}(1/2) \cdot d\lambda \quad (4)$$

<5> The identification medium according to any one of <1> to <4>, wherein a reflection ratio relative to incident non-polarized light of the first layer is 35% or more and 50% or less at all wavelengths in a wavelength region of 420 nm to 650 nm.

<6> The identification medium according to any one of <3> to <5>, wherein a wavelength of reflected light by the second layer and a wavelength of reflected light by the third layer each fall within a visible light region, and a difference ΔE' between a hue by the reflected light by the second layer and a hue by the reflected light by the third layer is 10 or more.

<7> A method for determining authenticity of the identification medium according to any one of <1> to <6>, comprising:

a first step of observing, from a second layer side of the identification medium, reflected light of light for irradiation of the identification medium from the second layer side and determining whether or not information by the second layer can be visually recognized; and a second step of observing, from a side that is opposite to the second layer side, reflected light of light for irradiation of the identification medium from the side that is opposite to the second layer side and determining whether or not the information by the second layer can be visually recognized.

<8> A method for determining authenticity of the identification medium according to any one of <3> to <6>, comprising:

a third step of observing, from a second layer side of the identification medium, reflected light of light for irradiation of the identification medium from the second layer side and determining whether or not information by the second layer and information by the third layer can be visually recognized; and a fourth step of observing, from a third layer side, reflected light of light for irradiation of the identification medium from the third layer side and determining whether or not the information by the second layer and the information by the third layer can be visually recognized.

<9> An article comprising the identification medium according to any one of <1> to <6>.

Advantageous Effects of Invention

According to the present invention, there can be provided an identification medium with which authenticity determination can be performed without using a viewer including a clockwise circular polarizing plate and a counterclockwise circular polarizing plate, a method for determining authenticity of the identification medium, and an article including the identification medium.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

Further, in the following description, the "pattern" refers to a planner shape of an object unless otherwise specified. Examples of the pattern may include characters, numbers, and figures.

In the following description, the "visible light region" refers to a wavelength range of 400 nm or longer and 780 nm or shorter.

In the following description, an in-plane retardation of a film or a layer is a value represented by (nx−ny)×d. A retardation in a thickness direction of a film or a layer is a value represented by {(nx+ny)/2−nz}×d. Herein, nx represents a refractive index in a direction in which the maximum refractive index is given among directions perpendicular to the thickness direction (in-plane directions) of the film or layer, ny represents a refractive index in a direction, among the above-mentioned in-plane directions of the film or layer, perpendicular to the direction giving nx, nz represents a refractive index in the thickness direction of the film or layer, and d represents the thickness of the film or layer. These retardations may be measured at a wavelength of 560 nm using a commercially available phase difference measuring device (for example, "WPA-micro" manufactured by Photonic Lattice Inc.) or the Senarmont method.

In the following description, "(meth)acrylic" encompasses acrylic, methacrylic, and a combination thereof. Further, "(meth)acrylate" encompasses acrylate, methacrylate, and a combination thereof. In addition, "(thio) epoxy" encompasses epoxy, thioepoxy, and a combination thereof. Moreover, "iso(thio)cyanate" encompasses isocyanate, isothiocyanate, and a combination thereof.

Embodiment 1

Hereinafter, an identification medium according to Embodiment 1 of the present invention will be described with reference to FIG. 1 to FIG. 9.

Figure 1:
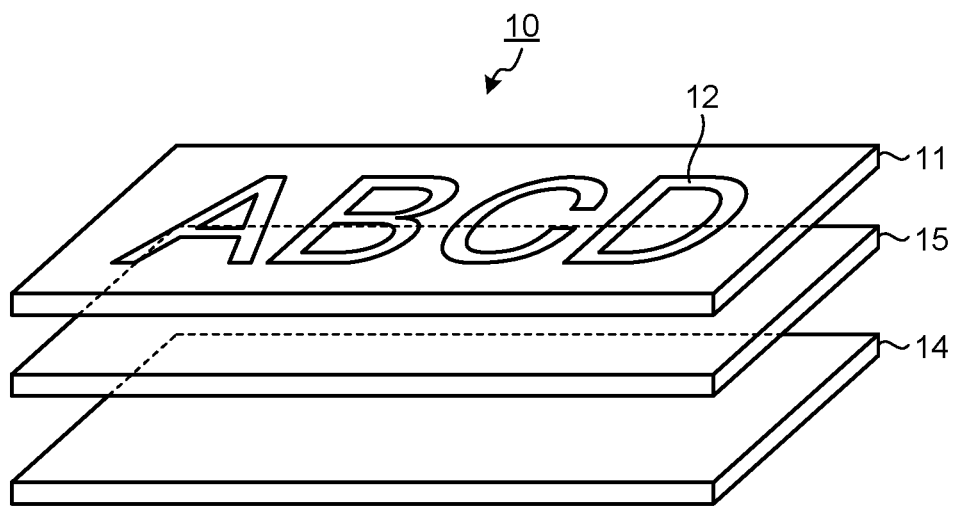
FIG. 1 is an exploded perspective view schematically illustrating an identification medium according to Embodiment 1.
Figure 2:
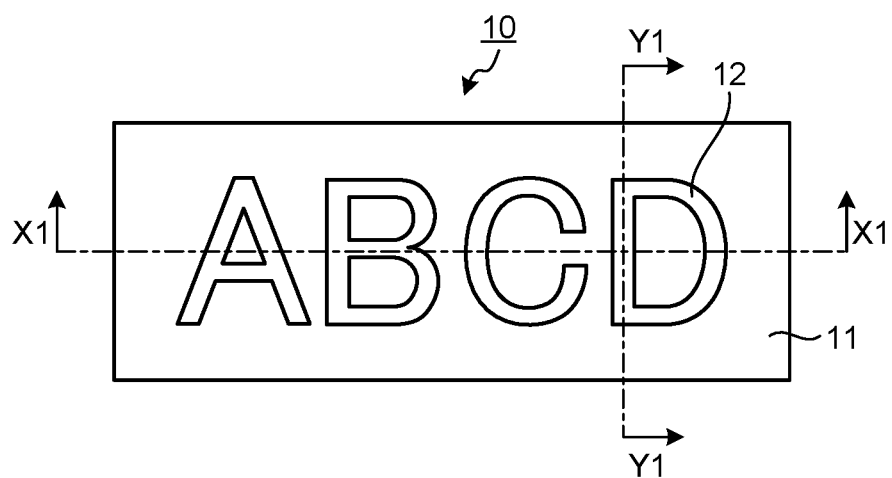
FIG. 2 is a plan view schematically illustrating the identification medium of Embodiment 1.
Figure 3:
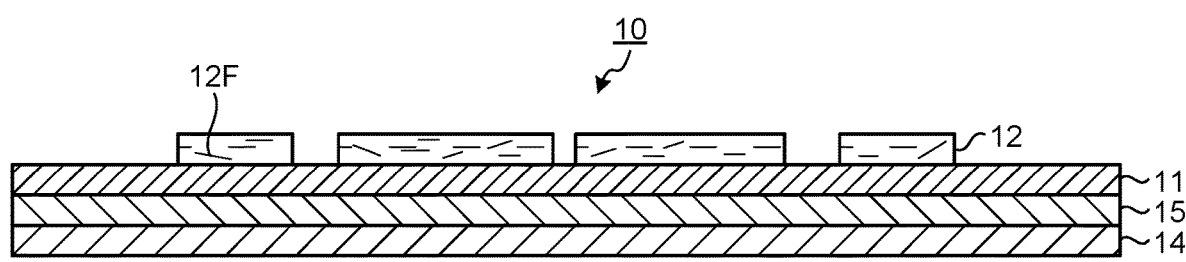
FIG. 3 is a cross-sectional view schematically illustrating a cross section in the X1-X1 direction of FIG. 2.
Figure 4:
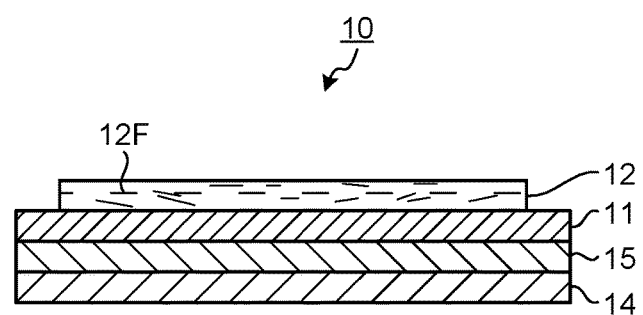
FIG. 4 is a cross-sectional view schematically illustrating a cross section in the Y1-Y1 direction of FIG. 2.
Figure 5:
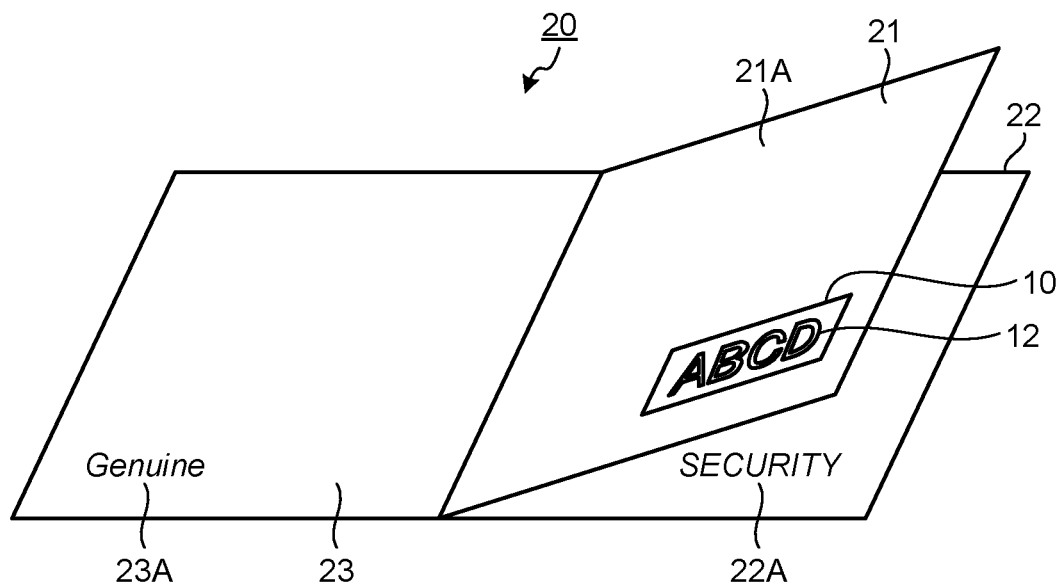
FIG. 5 is a perspective view schematically illustrating an article in which a second layer is disposed on the upper side.
Figure 6:
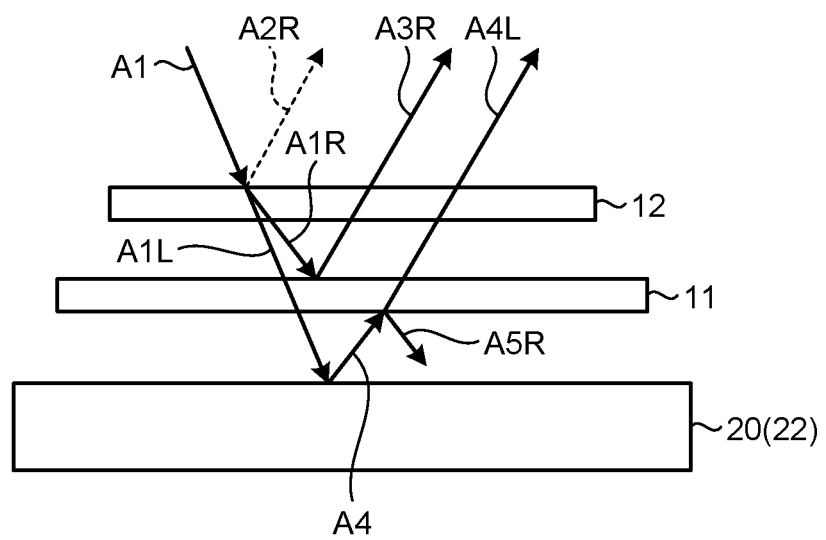
FIG. 6 is an exploded cross-sectional view schematically illustrating a path of light in a case wherein the identification medium is irradiated with the light from the second layer side.
Figure 7:
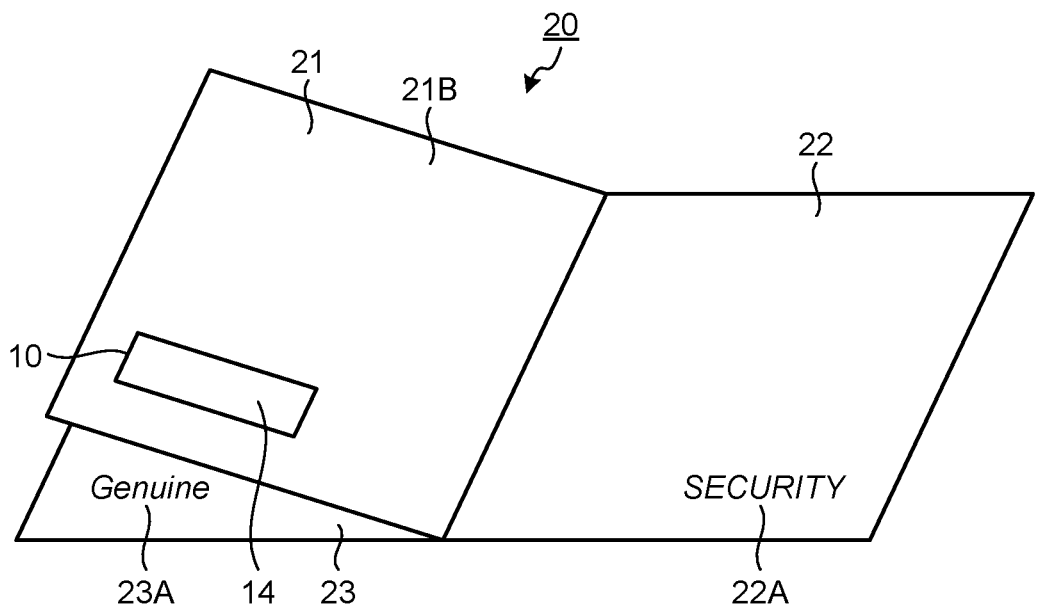
FIG. 7 is a perspective view schematically illustrating an article in which a substrate layer (first layer side) is disposed on the upper side.
Figure 8:
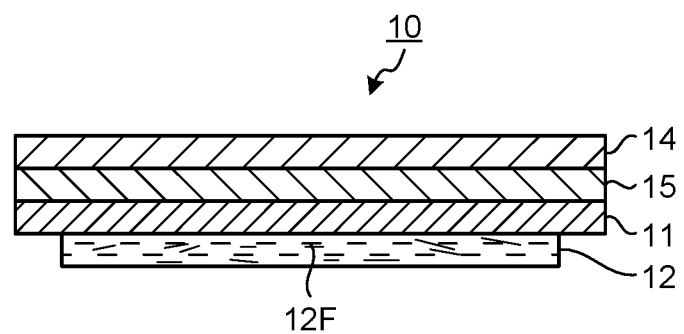
FIG. 8 is a cross-sectional view schematically illustrating the identification medium of FIG. 4 which is flipped upside down.
Figure 9:
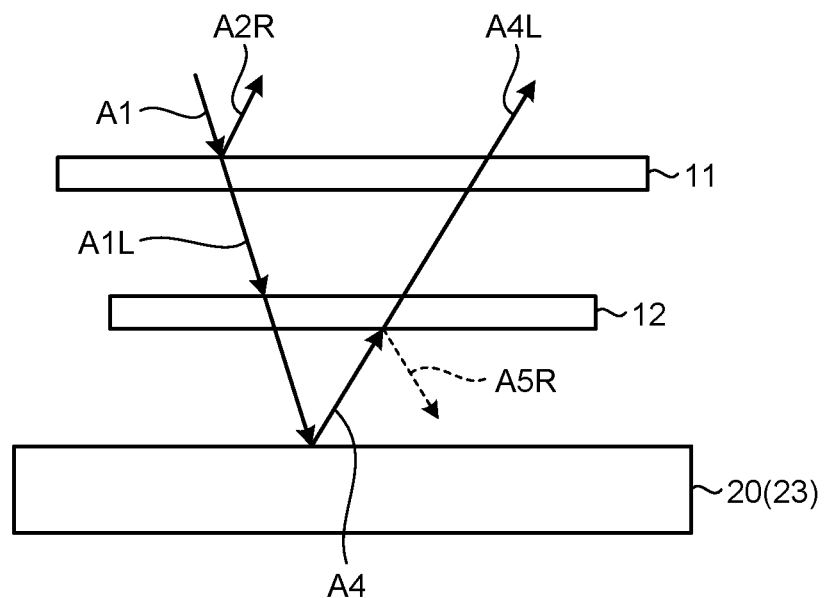
FIG. 9 is an exploded cross-sectional view schematically illustrating a path of light in a case wherein the identification medium is irradiated with the light from the first layer side.

FIG. 1 is an exploded perspective view schematically illustrating the identification medium according to Embodiment 1 of the present invention. FIG. 2 is a plan view schematically illustrating the identification medium of Embodiment 1. FIG. 3 is a cross-sectional view schematically illustrating a cross section in the X1-X1 direction of FIG. 2. FIG. 4 is a cross-sectional view schematically illustrating a cross section in the Y1-Y1 direction of FIG. 2. FIG. 5 is a perspective view schematically illustrating an article in which a second layer is disposed on the upper side. FIG. 6 is an exploded perspective view schematically illustrating a path of light in a case wherein the identification medium is irradiated with the light from the second layer side. FIG. 7 is a perspective view schematically illustrating an article in which a substrate layer (first layer side) is disposed on the upper side. FIG. 8 is a cross-sectional view schematically illustrating the identification medium of FIG. 4 which is flipped upside down. FIG. 9 is an exploded cross-sectional view schematically illustrating a path of light in a case wherein the identification medium is irradiated with the light from the first layer side.

(Summary of Identification Medium)

As illustrated in FIG. 1 to FIG. 4, an identification medium 10 of the present embodiment includes a first layer 11 and a second layer 12 disposed in a manner of overlapping with the first layer 11. In the identification medium 10 of the present embodiment, the reflection ratio of the first layer 11 and the reflection ratio of the second layer 12 have a specific relationship. As illustrated in FIG. 3, the identification medium 10 of the present embodiment includes a tackiness layer 15 and a substrate layer 14 below the first layer 11. As described herein, when a certain layer "overlaps" with another layer, it means that when the planer positional relationship between these layers is observed from the thickness direction of the identification medium, these layers are at least partly in the same planer position.

The first layer 11 is a layer that is capable of reflecting one of clockwise circular polarized light and counterclockwise circular polarized light and allowing the remaining circular polarized light to pass therethrough. The second layer 12 is a layer that is capable of reflecting at least a portion of circular polarized light having the same rotation direction as that of the circular polarized light that the first layer reflects, and allowing to pass therethrough circular polarized light having the opposite rotation direction to that of the circular polarized light that the first layer reflects. In the present embodiment, the second layer 12 is directly formed on the top surface of the first layer 11 as portions corresponding to the character pattern "ABCD". The second layer 12 is formed in an overlapping manner in a position such that the entire region thereof is on the first layer 11.

Since FIG. 3 is a schematic illustration, the cross-sectional shape of the second layer 12 is illustrated as a schematic shape. Specifically, the drawing illustrates, as the second layer 12, a schematic cross-sectional shape of a layer having a planar shape of the character pattern and the a certain thickness. The same applies to the cross-sectional shape of the second layer 12 in FIG. 4 and FIG. 8 as well as the cross-sectional shapes of a second layer 112 and a third layer 113 in FIG. 13, FIG. 14, and FIG. 18.

(Relationship Between Reflection Ratio of First Layer and Reflection Ratio of Second Layer)

In the identification medium 10 of the present embodiment, a ratio ($Ssf_2/S_2$) of $Ssf_2$ defined by the following formula (2) relative to $S_2$ defined by the following formula (1) is more than 0.7.

$$S_2 = \int_{400}^{780} \{(Rf_2(\lambda)) * (Rf_2(\lambda))\}^{\wedge}(1/2) \cdot d\lambda \tag{1}$$

In the formula (1), X represents a wavelength (nm), and $Rf_2(\lambda)$ represents a reflection ratio of the second layer at the wavelength ($\lambda$). The $S_2$ value defined by the formula (1) is an integrated value of a reflection ratio $Rf_2$ of the second layer in a wavelength range of 400 nm to 780 nm.

$$Ssf_2 = \int_{400}^{780} \{(Rs(\lambda)) * (Rf_2(\lambda))\}^{\wedge}(1/2) \cdot d\lambda \quad (2)$$

In the formula (2), $\lambda$ represents a wavelength (nm), and $Rs(\lambda)$ represents a reflection ratio of the first layer at the wavelength ($\lambda$). The $Ssf_2$ value defined by the formula (2) is an integrated value of a square root of the product of a reflection ratio Rs of the first layer and a reflection ratio $Rf_2$ of the second layer in a wavelength range of 400 nm to 780 nm.

$Rs(\lambda)$ and $Rf_2(\lambda)$ are a reflection ratio when non-polarized light at a wavelength ($\lambda$) in a wavelength range of 400 nm to 780 nm enters a target layer. The reflection ratio may be measured using, for example, a UV-visible spectrophotometer (UV-Vis 550, manufactured by JASCO Corporation). A value measured by the spectrophotometer may involve an interface reflection component. In such a case, the interface reflection component is subtracted to calculate the reflection ratios $Rs(\lambda)$ and $Rf_2(\lambda)$.

When $Ssf_2/S_2$ is more than 0.7, observation of the identification medium from the second layer side results in visual recognizability of the information of the second layer by the naked eye, although observation of the flipped identification medium from the first layer side results in the lack of visual recognizability of the information of the second layer. Therefore, a large $Ssf_2/S_2$ value is effective for the determination of authenticity. The $Ssf_2/S_2$ value is preferably 0.75 or more, and more preferably 1.0 or more. When the $Ssf_2/S_2$ value is 1.0 or more, there becomes almost no difference among individuals in the determination on whether or not the information is visually recognized, and thus determination can be performed objectively. The upper limit value of the $Ssf_2/S_2$ value may be preferably 5 or less, and more preferably 3 or less, although not particularly limited thereto. By setting the value to fall within such a range, the character pattern of the second layer can be visually recognized in a favorable manner.

The reflection ratio relative to incident non-polarized light of the first layer is preferably 35% or more and 50% or less at all wavelengths in the wavelength region of 420 nm to 650 nm. The reflection ratio is more preferably 40% or more, and further preferably 45% or more. When the reflection ratio relative to incident non-polarized light of the first layer falls within the aforementioned range, the first layer can be a broadband layer. This can increase a wavelength region in which the reflection spectrum of the first layer and the reflection spectrum of the second layer overlap, which increases the $Ssf_2/S_2$ value. The reflection ratio relative to incident non-polarized light of the first layer may involve an interface reflection component.

(Transparency of Identification Medium)

The identification medium of the present embodiment is preferably transparent or translucent. The identification medium 10 being transparent or translucent is preferable because it is unlikely to be subjected to reproduction or forgery. The transparency of the identification medium may be in a degree such that, when the identification medium is placed on an article on which a character, a picture, or the like is printed, the printed character or the like on the article is visually recognizable through the identification medium. When the identification medium is transparent or translucent, the transmittance of non-polarized light entering the identification medium may be preferably 20% or more, and more preferably 40% or more. The upper limit of the transmittance may be 90%, although not limited thereto.

Subsequently, layers constituting the identification medium 10 of the present embodiment will be described.

(First Layer)

The first layer 11 is a layer that is capable of reflecting one of clockwise circular polarized light and counterclockwise circular polarized light and allowing the remaining circular polarized light to pass therethrough. As the first layer 11, a layer of a resin having cholesteric regularity (hereinafter, also referred to as a "cholesteric resin layer") may be used. The cholesteric regularity possessed by the resin layer having cholesteric regularity is a structure in which the angles of molecular axes in stacking planes are shifted (twisted) as the planes are observed sequentially passing through the stacked planes, such that molecular axes in a first plane are oriented in a certain direction, molecular axes in a subsequent plain stacking on the first plane are oriented in a direction shifted by a small angle with respect to that of the first plane, and molecular axes in still another plane are oriented in a direction of a further shifted angle. That is, when molecules in the layer have cholesteric regularity, the molecules are aligned in a manner such that multiple molecular layers are formed in the resin layer. In a certain layer A among such multiple molecular layers, molecules are aligned in such a manner that axes of the molecules are directed in a certain direction. In the neighboring layer B, molecules are aligned in a direction that is shifted to form an angle with the direction in the layer A. In the further neighboring layer C, molecules are aligned in a direction that is further shifted to form an angle with the direction in the layer B. Thus, in the multiple molecular layers, the angles of the axes of the molecules are continuously shifted to form a structure in which molecules are twisted. Such a structure wherein the directions of the molecular axes are sequentially twisted constitutes an optically chiral structure.

The cholesteric resin layer usually has a circular polarized light separation function. That is, the cholesteric resin layer has a property of allowing to pass therethrough one of circular polarized light of clockwise circular polarized light and counterclockwise circular polarized light, and of reflecting a portion or the entirety of the other circular polarized light. The cholesteric resin layer reflects circular polarized light with its chirality maintained.

The wavelength for exerting a circular polarized light separation function depends on the pitch of the helical structure in the cholesteric resin layer. The pitch of the helical structure is the distance in the plane normal direction in the helical structure from an original plane to another plane in which the angle of the direction of the molecular axis that has been gradually and continuously shifted as proceeding through the planes from the original plane returns to the original molecular axis direction again. By changing the degree of this pitch of the helical structure, the wavelength for exerting a circular polarized light separation function can be changed.

The cholesteric resin layer may be obtained by, for example, forming a film of a cholesteric liquid crystal composition on an appropriate support body for forming a resin layer and then curing the film of the cholesteric liquid crystal composition. The obtained layer as it is may be used as the cholesteric resin layer. This cholesteric resin layer is a layer constituted of a film of a material itself that is capable of reflecting one of clockwise circular polarized light and counterclockwise circular polarized light and allowing the remaining circular polarized light to pass therethrough. Therefore, the cholesteric resin layer itself may be used as the first layer.

Examples of the cholesteric liquid crystal composition to be used for forming the cholesteric resin layer may include a composition that contains a liquid crystal compound and that is capable of exhibiting a cholesteric liquid crystal phase when its film is formed on a support body. Herein, examples of the liquid crystal compound to be used may include a liquid crystal compound that is a polymer compound and a polymerizable liquid crystal compound. A polymerizable liquid crystal compound is preferably used for obtaining high thermal stability. When such a polymerizable liquid crystal compound is polymerized while being in a state of exhibiting cholesteric regularity, the film of the cholesteric liquid crystal composition can be cured to obtain a non-liquid crystal resin layer as a result of curing while being in a state of exhibiting cholesteric regularity.

Examples of a suitable cholesteric resin layer having a high reflection ratio in the wavelength region of 420 nm to 650 nm may include (i) a cholesteric resin layer in which the size of the pitch of the helical structure is altered in a stepwise manner and (ii) a cholesteric resin layer in which the size of the pitch of the helical structure is continuously altered.

(i) The cholesteric resin layer in which the pitch of the helical structure is altered in a stepwise manner may be obtained by forming a plurality of cholesteric resin layers having different pitch of the helical structure. As a specific example, such a cholesteric resin layer may be produced by previously preparing a plurality of cholesteric resin layers having different pitch of the helical structure and thereafter fixing these layers via a tackiness agent or an adhesive agent. Alternatively, the cholesteric resin layer may be produced by forming a certain cholesteric resin layer and then sequentially forming other cholesteric resin layers on the formed certain cholesteric resin layer.

(ii) The cholesteric resin layer in which the size of the pitch of the helical structure is continuously altered is not particularly limited by its production method. A preferable example of the method for producing such a cholesteric resin layer may be a method wherein a cholesteric liquid crystal composition containing a polymerizable liquid crystal compound for forming a cholesteric resin layer is applied onto another layer that is preferably an orientation film or the like to thereby obtain a layer of the liquid crystal composition, and then light irradiation and/or warming treatment is performed once or more to thereby cure the obtained layer while keeping the pitch of the helical structure being continuously altered. Since such an operation is an operation to expand the reflection band of the cholesteric resin layer, it is called band broadening treatment. The band broadening treatment is preferable because even a cholesteric resin layer which is as thin as, for example, 5 μm or less can achieve a broad reflection band.

A preferable embodiment of the cholesteric liquid crystal composition to be subjected to such a band broadening treatment may be a cholesteric liquid crystal composition (λ) described in detail later.

As the cholesteric resin layer in which the size of the pitch of the helical structure continuously altered, one layer may be solely used, and a plurality of layers may be used in a stacked manner. For example, a cholesteric resin layer that exerts a circular polarized light separation function in a part of the visible light region and a cholesteric resin layer that exerts a circular polarized light separation function in another part of the region may be combined to use the first resin layer that exerts a circular polarized light separation function in a wide region of the visible light region.

In this manner, the cholesteric resin layer may be a resin layer including only one layer and may be a resin layer including two or more layers. When two or more layers are included, the cholesteric resin layer may include two or more of the cholesteric resin layer (i), two or more of the cholesteric resin layer (ii), or two or more layers that are a combination of the cholesteric resin layers (i) and (ii). The number of layers constituting the cholesteric resin layer is preferably 1 to 100, and more preferably 1 to 20, from the viewpoint of simple production. When a cholesteric resin layer only one layer of which can exert a high reflection ratio is obtained as a result of the aforementioned band broadening treatment, an identification medium of a preferable embodiment can be obtained even with only one layer.

The cholesteric liquid crystal composition (X) contains a compound represented by the following formula (5) and a specific rod-like liquid crystal compound. As each of the compound represented by the formula (5) and the rod-like liquid crystal compound, one type thereof may be solely used, and two or more types thereof may also be used in combination at any ratio.

Hereinafter, each of these components will be described in sequence.

$$R^1\text{-}A^1\text{-}B\text{-}A^2\text{-}R^2 \qquad (5)$$

In the formula (5), $R^1$ and $R^2$ are each independently a group selected from the group consisting of a linear or branched alkyl group of 1 to 20 carbon atoms, a linear or branched alkylene oxide group of 1 to 20 carbon atoms, a hydrogen atom, a halogen atom, a hydroxyl group, a carboxyl group, a (meta)acrylic group, an epoxy group, a mercapto group, an isocyanate group, an amino group, and a cyano group.

The alkyl group and the alkylene oxide group may be unsubstituted or substituted with one or more halogen atoms. The halogen atom, hydroxyl group, carboxyl group, (meta)acrylic group, epoxy group, mercapto group, isocyanate group, amino group, and cyano group may be bonded to an alkyl group of 1 to 2 carbon atoms, and an alkylene oxide group.

Preferable examples of $R^1$ and $R^2$ may include a halogen atom, a hydroxyl group, a carboxyl group, a (meth)acrylic group, an epoxy group, a mercapto group, an isocyanate group, an amino group, and a cyano group.

It is preferable that one or more of $R^1$ and $R^2$ are reactive groups. When the compound represented by the abovementioned formula (5) has a reactive group as one or more of $R^1$ and $R^2$, the compound can be fixed in the cholesteric resin layer upon curing, so that a stronger layer can be formed. Herein, examples of the reactive group may include a carboxyl group, a (meth)acrylic group, an epoxy group, a mercapto group, an isocyanate group, and an amino group.

In the formula (5), $A^1$ and $A^2$ each independently represent a group selected from the group consisting of a 1,4-phenylene group, a 1,4-cyclohexylene group, a 1,4-cyclohexenyl group, a 4,4'-biphenylene group, a 4,4'-bicyclohexylene group, and a 2,6-naphthylene group. The 1,4-phenylene group, 1,4-cyclohexylene group, 1,4-cyclohexenyl group, 4,4'-biphenylene group, 4,4'-bicyclohexylene group, and 2,6-naphthylene group may not be substituted or may be substituted with one or more substituents such as a halogen atom, a hydroxyl group, a carboxyl group, a cyano group, an amino group, an alkyl group of 1 to 10 carbon atoms, or a halogenated alkyl group. When two or more substituents are present in each of $A^1$ and $A^2$, they may be the same or different.

Particularly preferable examples of $A^1$ and $A^2$ may include groups selected from the group consisting of a 1,4-phenylene group, a 4,4'-biphenylene group, and a 2,6-naphthylene group. These aromatic ring skeletons are relatively rigid compared to the alicyclic skeleton, and have high affinity to the mesogen of the rod-like liquid crystal compound and higher orientation uniformity.

In the formula (5), B is selected from the group consisting of a single bond, —O—, —S—, —S—S—, —CO—, —CS—, —OCO—, —CH$_2$—, —OCH$_2$—, —CH=N—N=CH—, —NHCO—, —OCOO—, —CH$_2$COO—, and —CH$_2$OCO—.

Particularly preferable examples of B may include a single bond, —OCO—, and —CH=N—N=CH—.

At least one of the compounds of the formula (5) preferably has liquid crystal properties, and preferably has chirality. Further, it is preferable that the cholesteric liquid crystal composition (X) contains a mixture of a plurality of optical isomers as the compound of the formula (5). For example, it may contain a mixture of a plurality of types of enantiomers and/or diastereomers. It is preferable that at least one of the compounds of the formula (5) has a melting point falling within a range of 50° C. to 150° C.

When the compound of the formula (5) has liquid crystal properties, it is preferable that the compound has a high Δn. By using a liquid crystal compound having high Δn as the compound of the formula (5), Δn as the cholesteric liquid crystal composition (X) can be improved, and a cholesteric resin layer having a wide wavelength range within which the layer can reflect circular polarized light can be produced. It is preferable that Δn of at least one of the compounds of the formula (5) is 0.18 or more, and more preferably 0.22 or more. The upper limit of Δn may be, for example, 0.50.

Particularly preferable specific examples of the compound of the formula (5) may include the following compounds (A1) to (A10):

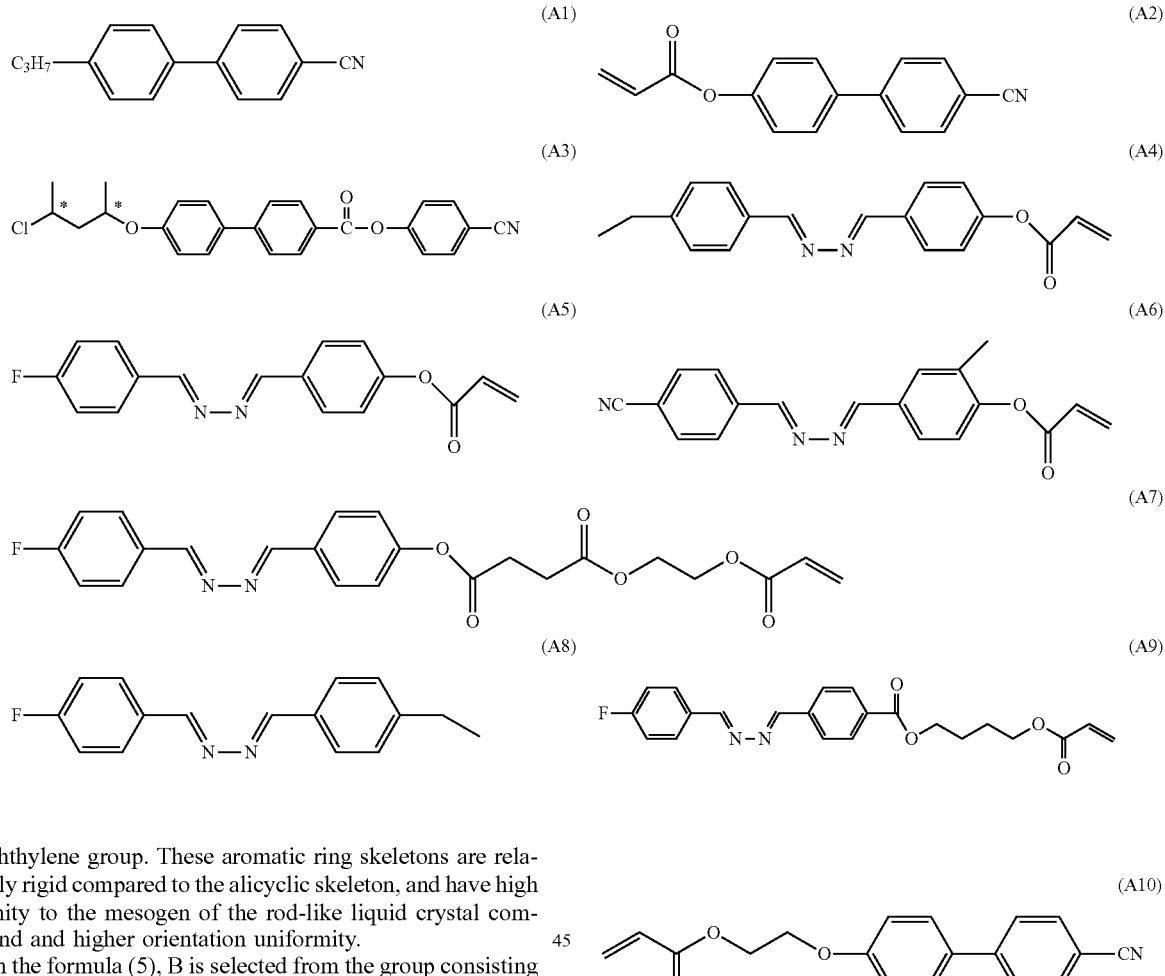

In the foregoing compound (A3), "*" represents a chiral center.

The cholesteric liquid crystal composition (X) usually contains a rod-like liquid crystal compound having Δn of 0.18 or more and having 2 or more reactive groups in one molecule.

Examples of the rod-like liquid crystal compound may include compounds represented by the formula (6).

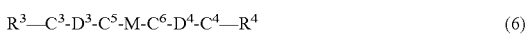

In the formula (6), $R^3$ and $R^4$ are reactive groups, and each independently represent a group selected from the group consisting of a (meth)acrylic group, a (thio)epoxy group, an oxetane group, a thiethanyl group, an aziridinyl group, a pyrrole group, a vinyl group, an allyl group, a fumarate group, a cinnamoyl group, an oxazoline group, a mercapto group, an iso(thio)cyanate group, an amino group, a hydroxyl group, a carboxyl group, and an alkoxysilyl group.

By having these reactive groups, a cured product having a film strength capable of withstanding practical use can be obtained when the cholesteric liquid crystal composition is cured. Herein, the film strength that can withstand practical use may be evaluated as the pencil hardness (JIS K5400), and is usually HB or harder, and preferably H or harder. By increasing the film strength in this manner, possibility of having a scratch wound can be reduced, and therefore handleability can be improved.

In the formula (6), $D^3$ and $D^4$ represent a group selected from the group consisting of a single bond, a linear or branched alkyl group of 1 to 20 carbon atoms, and a linear or branched alkylene oxide group of 1 to 20 carbon atoms.

In the formula (6), $C^3$ to $C^6$ represent a group selected from the group consisting of a single bond, —O—, —S—, —S—S—, —CO—, —CS—, —OCO—, —CH$_2$—, —OCH$_2$-, —CH=N—N=CH—, —NHCO—, —OCOO—, —CH$_2$COO—, and —CH$_2$OCO—.

In the formula (6), M represents a mesogenic group. Specifically, M represents a group obtained by bonding two to four skeletons, which may be unsubstituted or may have a substituent, via a linking group such as —O—, —S—, —S—S—, —CO—, —CS—, —OCO—, —CH$_2$—, —OCH$_2$—, —CH=N—N=CH—, —NHCO—, —OCOO—, —CH$_2$COO—, and —CH$_2$OCO—, the skeleton being selected from the group consisting of azomethines, azoxys, phenyls, biphenyls, terphenyls, naphthalenes, anthracenes, benzoic acid esters, cyclohexane carboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles.

Examples of the substituents which the mesogenic group M may have may include a halogen atom, an alkyl group of 1 to 10 carbon atoms optionally having a substituent, a cyano group, a nitro group, —O—R$^5$, —O—C(=O)—R$^5$, —C(=O)—O—R$^5$, —O—C(=O)—O—R$^5$, —NR$^5$—C(=O)—R$^5$, —C(=O)—NR$^5$R$^7$, and —O—C(=O)—NR$^5$R$^7$. Herein, R$^5$ and R$^7$ represent a hydrogen atom or an alkyl group of 1 to 10 carbon atoms. When R$^5$ and R$^7$ are an alkyl group, the alkyl group may contain the following group interposed therein: —O—, —S—, —O—C(=O)—, —C(=O)—O—, —O—C(=O)—O—, —NR$^6$—C(=O)—, —C(=O)—NR$^6$—, —NR$^6$—, or —C(=O)— (except the case where two or more —O-'s or —S-'s are adjacently interposed). Herein, R$^6$ represents a hydrogen atom or an alkyl group of 1 to 6 carbon atoms.

Examples of the substituents in the aforementioned "alkyl group of 1 to 10 carbon atoms optionally having a substituent" may include a halogen atom, a hydroxyl group, a carboxyl group, a cyano group, an amino group, an alkoxy group of 1 to 6 carbon atoms, an alkoxyalkoxy group of 2 to 8 carbon atoms, an alkoxyalkoxyalkoxy group of 3 to 15 carbon atoms, an alkoxycarbonyl group of 2 to 7 carbon atoms, an alkylcarbonyloxy group of 2 to 7 carbon atoms, and an alkoxycarbonyloxy group of 2 to 7 carbon atoms.

Further, it is preferable that the rod-like liquid crystal compound has an asymmetric structure. Herein, the asymmetric structure refers to a structure in which $R^3$—$C^3$-$D^3$-$C^5$— and —$C^6$-$D^4$-$C^4$—$R^4$ in the formula (6) are different about the mesogenic group M as the center. By using those having an asymmetric structure as the rod-like liquid crystal compound, the orientation uniformity can be further improved.

An of the rod-like liquid crystal compound is preferably 0.18 or more, and more preferably 0.22 or more. When a rod-like liquid crystal compound having a Δn value of 0.30 or more is used, the absorption end on the long wavelength side of the ultraviolet absorption spectrum may extend to the visible range in some cases. However, rod-like liquid crystal compounds whose absorption end extends to the visible range of the spectrum may also be used as long as the spectrum does not adversely affect the desired optical performance. By using such a rod-like liquid crystal compound having a high Δn, it is possible to obtain a cholesteric resin layer having a high optical performance (for example, a performance of selective reflection for circular polarized light). The upper limit of Δn may be, for example, 0.50.

Preferable specific examples of the rod-like liquid crystal compound may include the following compounds (B1) to (B10), although the rod-like liquid crystal compound is not limited to these.

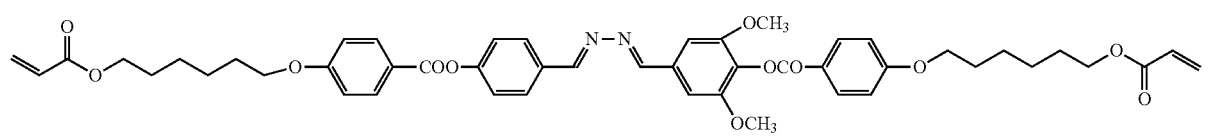

(B1)

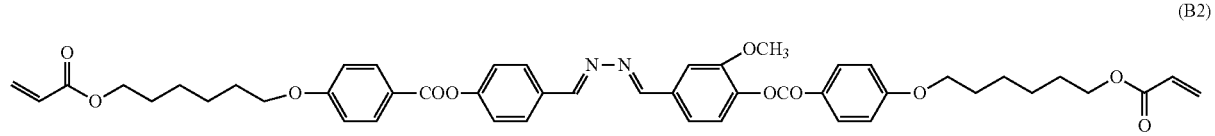

(B2)

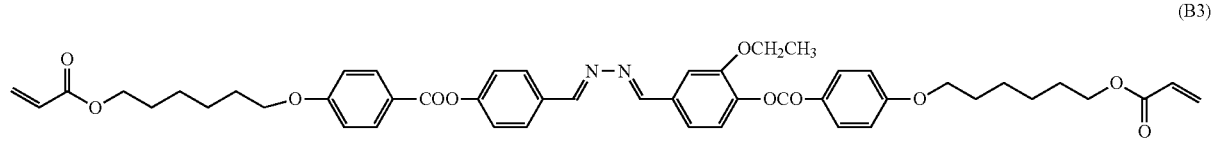

(B3)

-continued

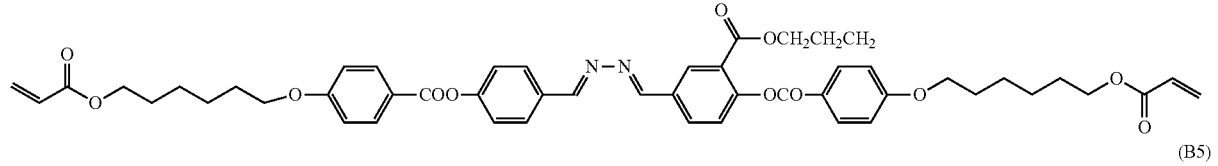
(B4)

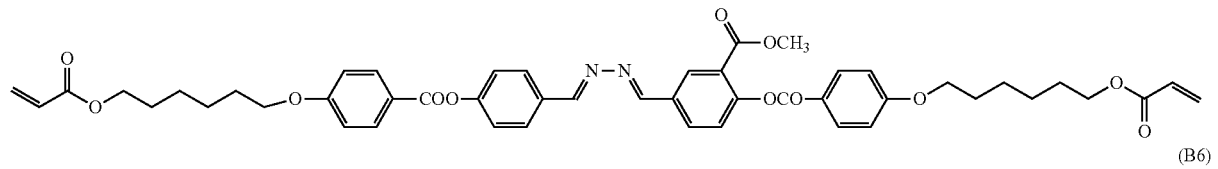
(B5)

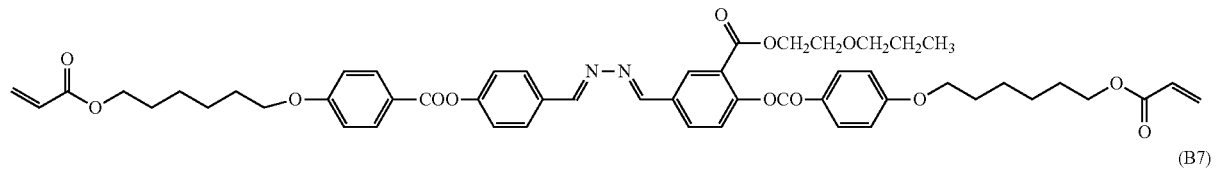
(B6)

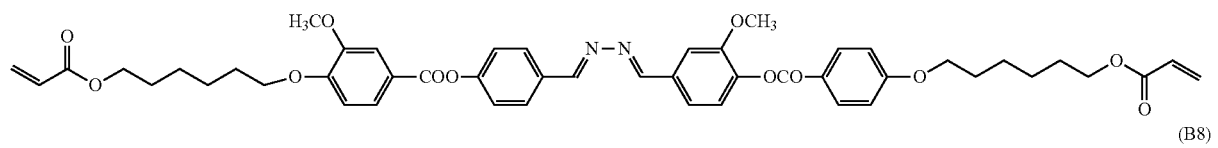
(B7)

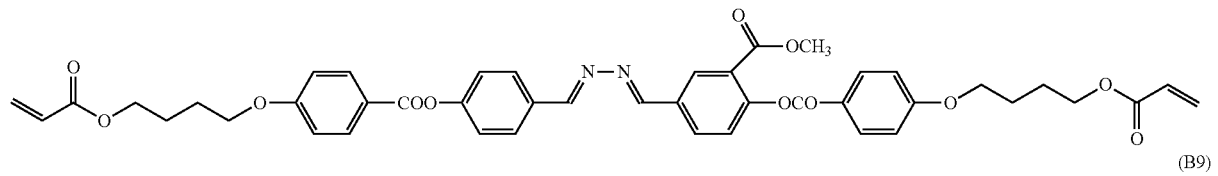
(B8)

(B9)

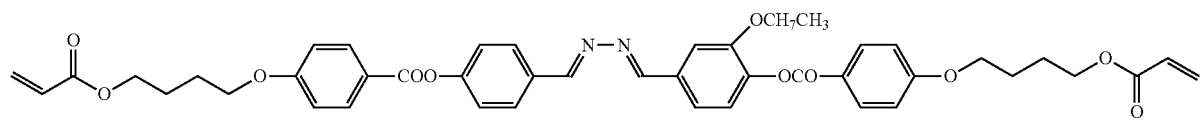
(B10)

In the cholesteric liquid crystal composition (X), the weight ratio of (total weight of the compound of the formula (5))/(total weight of the rod-like liquid crystal compound) is preferably 0.05 or more, more preferably 0.1 or more, and particularly preferably 0.15 or more, and is preferably 1 or less, more preferably 0.65 or less, and particularly preferably 0.45 or less. By setting the weight ratio to be equal to or more than the lower limit value of the foregoing range, the orientation uniformity can be enhanced. By setting the weight ratio to be equal to or less than the upper limit value, it is possible to increase the orientation uniformity and the stability of the liquid crystal phase. Furthermore, it is possible to increase Δn as the liquid crystal composition so as to stably obtain a desired optical performance (for example, a characteristic of selectively reflecting circular polarized light). Herein, the total weight refers to the weight of the compound when only one type of the compounds is used, and refers to the total weight when two or more types of the compounds are used.

In the cholesteric liquid crystal composition (X), the molecular weight of the compound of the formula (5) is preferably less than 600, and the molecular weight of the rod-like liquid crystal compound is preferably 600 or more. When these compounds have such molecular weights, the compound of the formula (5) can enter into the gap of the rod-like liquid crystal compound having a molecular weight larger than that of the compound of the formula (5), and thereby the orientation uniformity can be improved.

The cholesteric liquid crystal composition such as the cholesteric liquid crystal composition (X) may optionally contain a crosslinking agent for improving film strength and improving durability after curing. As the crosslinking agent, those which can react simultaneously with curing the film of the cholesteric liquid crystal composition, can accelerate the reaction as a result of performing a heat treatment after curing, or can increase the crosslinking density of the cholesteric resin layer as a result of spontaneous proceeding of the reaction with moisture, while not deteriorating the orientation uniformity, may be appropriately selected for use. Therefore, for example, any crosslinking agent with which the composition is cured by ultraviolet rays, heat, moisture, or the like may be suitably used. Examples of the crosslinking agent may include a polyfunctional acrylate compound such as trimethylolpropane tri(meth)acrylate, pentaerythritol tri(meth)acrylate, pentaerythritol tetra(meth)acrylate, dipentaerythritol hexa(meth)acrylate, and 2-(2-vinyloxyethoxy)ethylacrylate; an epoxy compound such as glycidyl(meth)acrylate, an ethylene glycol diglycidyl ether, a glycerol triglycidyl ether, and a pentaerythritol tetraglycidyl ether; an aziridine compound such as 2,2-bishydroxymethylbutanol-tris[3-(1-aziridinyl)propionate], 4,4-bis(ethyleneiminocarbonylamino)diphenylmethane, and trimethylolpropane-tri-β-aziridinylpropionate; an isocyanate compound such as hexamethylene diisocyanate, an isocyanurate type isocyanate derived from hexamethylene diisocyanate, a biuret type isocyanate, and an adduct type isocyanate; a polyoxazoline compound having an oxazoline group in a side chain; and an alkoxysilane compound such as vinyltrimethoxysilane, N-(2-aminoethyl)3-aminopropyltrimethoxysilane, 3-aminopropyltrimethoxysilane, 3-glycidoxypropyltrimethoxysilane, 3-(meth)acryloxypropyltrimethoxysilane, and N-(1,3-dimethylbutylidene)-3-(triethoxysilyl)-1-propanamine. As the crosslinking agent, one type thereof may be solely used, and two or more types thereof may also be used in combination at any ratio. A publicly known catalyst may be used depending on the reactivity of the crosslinking agent used. By using a catalyst, productivity can be improved in addition to the improvement in film strength and durability of the cholesteric resin layer.

The amount of the crosslinking agent is preferably set such that the amount of the crosslinking agent in the cured film obtained by curing the film of the cholesteric liquid crystal composition is 0.1% by weight to 15% by weight. By setting the amount of the crosslinking agent to be equal to or more than the lower limit value of the foregoing range, the crosslinking density can be effectively increased. By setting the amount to be equal to or less than the upper limit value, the stability of the film of the cholesteric liquid crystal composition can be increased.

The cholesteric liquid crystal composition may optionally contain a photoinitiator. Examples of the photoinitiator may include publicly known compounds which generate a radical or an acid by ultraviolet or visible light. Specific examples of the photoinitiator may include benzoin, benzyl methyl ketal, benzophenone, biacetyl, acetophenone, Michler's ketone, benzil, benzyl isobutyl ether, tetramethylthiuram mono(di)sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropan-1-one, thioxanthone, 2-chlorothioxanthone, 2-methylthioxanthone, 2,4-diethylthioxanthone, methylbenzoylformate, 2,2-diethoxyacetophenone, β-ionone, β-bromostyrene, diazoaminobenzene, α-amylcinnamic aldehyde, p-dimethylaminoacetophenone, p-dimethylaminopropiophenone, 2-chlorobenzophenone, p,p'-dichlorobenzophenone, p,p'-bisdiethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenylphosphine oxide, 2-methyl-1[4-(methylthio)phenyl]-2-morpholinopropan-1-one, 2-benzyl-2-dimethylamino-1-(4-morpholinophenyl)-butan-1-one, anthracenebenzophenone, a-chloroanthraquinone, diphenyl disulfide, hexachlorobutadiene, pentachlorobutadiene, octachlorobutene, 1-chloromethylnaphthalene, 1,2-octanedione, a carbazole oxime compound such as 1-[4-(phenylthio)-2-(o-benzoyloxime)] and 1-[9-ethyl-6-(2-methylbenzoyl)-9H-carbazole-3-yl]ethanone 1-(o-acetyloxime), (4-methylphenyl)[4-(2-methylpropyl)phenyl]iodonium hexafluorophosphate, 3-methyl-2-butynyl tetramethylsulfonium hexafluoroantimonate, and diphenyl-(p-phenylthiophenyl)sulfonium hexafluoroantimonate. As these agents, one type thereof may be solely used, and two or more types thereof may also be used in combination at any ratio. Further, if necessary, a tertiary amine compound as a publicly known photosensitizer or polymerization accelerator may be used to control curability.

The amount of the photoinitiator in the cholesteric liquid crystal composition is preferably 0.03% by weight to 7% by weight. By setting the amount of the photoinitiator to be equal to or more than the lower limit value of the foregoing range, the degree of polymerization can be increased, and thereby the film strength of the cholesteric resin layer can be increased. By setting the amount to be equal to or less than the upper limit value, orientation of the liquid crystal material can be improved, and it is thereby possible to stabilize the liquid crystal phase of the cholesteric liquid crystal composition.

The cholesteric liquid crystal composition may optionally contain a surfactant. As the surfactant, for example, those which do not inhibit orientation may be appropriately selected for use. Examples of such a surfactant may include a nonionic surfactant containing a siloxane or an alkyl fluoride group in a hydrophobic group moiety. Among these, an oligomer having two or more hydrophobic group moieties in one molecule is particularly suitable. Specific examples of these surfactants may include PF-151N, PF-636, PF-6320, PF-656, PF-6520, PF-3320, PF-651, and PF-652 of PolyFox available from OMNOVA Solutions Inc.; FTX-209F, FTX-208G, and FTX-204D of Ftergent available from NEOS Co., Ltd.; and KH-40 of Surflon available from AGC Seimi Chemical Co., Ltd. As these surfactants, one type thereof may be solely used, and two or more types thereof may also be used in combination at any ratio.

The amount of the surfactant is preferably set such that the amount of the surfactant in the cured film obtained by curing the cholesteric liquid crystal composition is 0.05% by weight to 3% by weight. By setting the amount of the surfactant to be equal to or more than the lower limit value of the foregoing range, orientation regulating force at the air interface can be increased, so that orientation defects can be prevented. Further, by setting the amount to be equal to or lower than the upper limit value, it is possible to prevent the lowering of the orientation uniformity due to the excessive surfactant entering between the liquid crystal molecules.

The cholesteric liquid crystal composition may optionally contain a chiral agent. Usually, the twisting direction of the cholesteric resin layer can be appropriately selected by choosing the type and structure of the chiral agent used. Clockwise twisting may be achieved by employing a chiral agent for imparting dextrorotation, and counterclockwise twisting may be achieved by a chiral agent for imparting levorotation. Specific examples of the chiral agent that may be appropriately used may include those disclosed in Japanese Patent Application Laid-Open No. 2005-289881 A, Japanese Patent Application Laid-Open No. 2004-115414 A, Japanese Patent Application Laid-Open No. 2003-66214, Japanese Patent Application Laid-Open No. 2003-313187, Japanese Patent Application Laid-Open No. 2003-342219, Japanese Patent Application Laid-Open No. 2000-290315, Japanese Patent Application Laid-Open No. Hei. 6-072962 A, U.S. Pat. No. 6,468,444, International Publication No. 98/00428, and Japanese Patent Application Laid-Open No. 2007-176870 A. They may be available such as, for example, Paliocolor LC756 of BASF Corporation. As the chiral agents, one type thereof may be solely used, and two or more types thereof may also be used in combination at any ratio.

The amount of the chiral agent may be optionally set within a range in which the chiral agent does not reduce the desired optical performance. The specific amount of the chiral agent in the cholesteric liquid crystal composition is usually 1% by weight to 60% by weight.

If necessary, the cholesteric liquid crystal composition may further contain other optional components. Examples of the optional component may include a solvent, a polymerization inhibitor for improving pot life, an antioxidant for improving durability, an ultraviolet absorber, and a light stabilizer. As these optional components, one type thereof may be solely used, and two or more types thereof may also be used in combination at any ratio. The amount of these optional components may be freely adjusted within a range in which the optional component does not reduce the desired optical performance.

The method for producing the cholesteric liquid crystal composition is not particularly limited, and the cholesteric liquid crystal composition may be produced by mixing the foregoing components.

The cholesteric resin layer may be obtained, for example, by subjecting a surface of a support body constituted of a film such as the one made of a transparent resin to a treatment such as a corona discharge treatment and a rubbing treatment if necessary, further providing an orientation film if necessary, further providing a film of a cholesteric liquid crystal composition on this surface, and further performing an orientation treatment and/or a treatment of curing if necessary.

Examples of the support body which may be used for forming a cholesteric resin layer may include a monolayer film and a multilayer film made of a synthetic resin such as an alicyclic olefin polymer, a chain olefin polymer such as a polyethylene and a polypropylene, a triacetyl cellulose, a polyvinyl alcohol, a polyimide, a polyarylate, a polyester such as a polyethylene terephthalate, a polycarbonate, a polysulfone, a polyether sulfone, a modified acrylic polymer, an epoxy resin, a polystyrene, and an acrylic resin.

The orientation film may be formed, for example, by subjecting a surface of a support body to a corona discharge treatment or the like if necessary, then applying a solution, which has been obtained by dissolving the materials for the orientation film in a solvent, onto the surface of the support body, drying the solution, and then subjecting the resultant to a rubbing treatment.

Examples of the materials for the orientation film may include cellulose, a silane coupling agent, a polyimide, a polyamide, a polyvinyl alcohol, an epoxy acrylate, a silanol oligomer, a polyacrylonitrile, a phenol resin, a polyoxazole, and a cyclized polyisoprene.

The application of the cholesteric liquid crystal composition on the support body or on the orientation film may be performed by a publicly known method, for example, an extrusion coating method, a direct gravure coating method, a reverse gravure coating method, a die coating method, or a bar coating method.

The orientation treatment may be performed, for example, by warming the film of a cholesteric liquid crystal composition at 50° C. to 150° C. for 0.5 minute to 10 minutes. By subjecting the film to the orientation treatment, the cholesteric liquid crystal composition in the film can be well oriented.

The curing treatment may be performed by a combination of one or more light irradiation and a warming treatment.

The conditions for warming may be, for example, at usually 40° C. or higher, preferably 50° C. or higher, and usually 200° C. or lower, preferably 140° C. or lower, for usually 1 second or longer, preferably 5 seconds or longer, and usually 3 minutes or shorter, preferably 120 seconds or shorter.

The light for light irradiation encompasses not only visible light but also ultraviolet rays and other electromagnetic waves. The light irradiation may be performed, for example, by irradiating the film with light at a wavelength in a range of 200 nm to 500 nm for 0.01 second to 3 minutes.

Herein, by alternately repeating the weak ultraviolet ray irradiation of 0.01 mJ/cm$^2$ to 50 mJ/cm$^2$ and the warming a plurality of times, it is possible to obtain a circular polarized light separation function with a wide reflection band as a result of a large degree of continuous alteration of the pitches of the helical structure. Further, after expanding the reflection band by the above-mentioned weak ultraviolet ray irradiation and the like, irradiation with relatively strong ultraviolet rays such as 50 mJ/cm$^2$ to 10,000 mJ/cm$^2$ may be performed for achieving complete polymerization the liquid crystal compound, to thereby obtain the cholesteric resin layer. The expansion of the reflection band and the irradiation of strong ultraviolet rays mentioned above may be performed in air. Alternatively, a part or all of the steps thereof may be performed in an atmosphere in which the oxygen concentration has been controlled (for example, under a nitrogen atmosphere).

The step of applying onto another such as an orientation film layer and curing of the cholesteric liquid crystal composition is not limited to one time, and the coating and curing may be repeated a plurality of times to form two or more cholesteric resin layers. However, by using the cholesteric liquid crystal composition such as the cholesteric liquid crystal composition (X), it is possible to easily form a cholesteric resin layer containing a well-oriented rod-like liquid crystal compound having a Δn of 0.18 or more and having a thickness of 5 μm or more even when the cholesteric liquid crystal composition is applied and cured only one time.

The cholesteric resin layer thus obtained as it is may be used as a first layer together with the support body and the orientation film. If necessary, the support body or the like may be peeled off, and the cholesteric resin layer alone may be transferred, for use as the first layer.

The thickness of the first layer is preferably 2 µm or more, and more preferably 3 µm or more, and is preferably 1000 µm or less, and more preferably 500 µm or less. By setting the thickness of the first layer to be equal to or more than the lower limit value, it is possible to make the information of the second layer less visually recognizable when the second layer is observed from the first layer side, thereby making it possible to more clearly identify the authenticity. By setting the thickness of the first layer to be equal to or less than the upper limit value, transparency can be enhanced. Herein, when the first layer includes two or more layers, the thickness of the first layer refers to the total thickness of the thicknesses of the respective layers. When the first layer is a single layer, the thickness of the first layer refers to its thickness. When a support body is used, the in-plane retardation of the support body is preferably 20 nm or less, more preferably 10 nm or less, and ideally 0 nm. By setting the retardation to be equal to or less than the upper limit value, circular polarized light generated in the first layer and the second layer is maintained, and the determination of authenticity can be achieved in further clear manner.

(Second Layer)

In the present invention, the second layer is a layer provided directly (i.e., in a contact state) or indirectly (i.e., isolated via another layer, etc.) in an overlapped manner on the first layer. In this embodiment, the second layer 12 is a layer provided so as to directly disposed on the first layer in an overlapping manner. The second layer is a layer capable of reflecting at least a portion of the circular polarized light in the same rotation direction as that of the circular polarized light that the first layer reflects, and allowing to pass therethrough the circular polarized light in the rotation direction opposite to that of the circular polarized light that the first layer reflects. That is, the second layer 12 is a layer that does not reflect or hardly reflect circular polarized light in the rotation direction opposite to that of the circular polarized light that the first layer reflects.

The second layer 12 is preferably a layer that contains flakes of a resin having cholesteric regularity (also referred to as a "cholesteric resin"). The cholesteric resin layer suitable as the first layer 11 can reflect one of clockwise circular polarized light and counterclockwise circular polarized light and allow to pass therethrough the remaining circular polarized light in at least a portion of the visible light region, even when it is pulverized. Therefore, the pulverized product is preferably used as flakes in the second layer 12.

From the viewpoint of clear identification of authenticity and high design flexibility, the cholesteric resin to serve as a material of the flakes preferably has as high reflection ratio as possible, which leads to a high reflection ratio in the wavelength range for reflection.

Flakes of the cholesteric resin may be produced by, for example, a method for producing a peel piece described in Japanese Patent No. 6142714 B.

Flakes of a material having no polarization properties may be used together with the flakes of the cholesteric resin. Examples of the flakes having no polarization properties may include one or more types of flakes selected from carbon black as well as oxides, nitrides, and nitride oxides of metals belonging to families 3 to 11 in the 4th period of the periodic table of elements. As these flakes, one type thereof may be solely used, and two or more types thereof may also be used in combination at any ratio.

The particle diameter of flakes 12F contained in the second layer 12 is preferably 1 µm or more for obtaining decorative properties. Especially, the particle diameter is more preferably not less than the film thickness of the second layer 12. (In this case, the particle diameter of a flake refers to the diameter of a circle having the same area as that of the flake. That is, the particle diameter of a flake is a diameter obtained by observing a planar image of a flake and calculating the diameter of a circle having the same area as that of the image). Accordingly, the size in the in-plane direction of the flake becomes larger than the size thereof in the thickness direction. Therefore, the flakes are easily oriented in such a manner that the in-plane direction of the flakes and the in-plane direction of the second layer are in parallel or form an acute angle. Consequently, the flakes can effectively receive light entering the second layer. This can enhance the circular polarized light separation function of the second layer. From the viewpoint of obtaining molding properties and printability of the film, the particle diameter of the flakes is preferably 500 µm or less, and more preferably 100 µm or less.

For this embodiment, the second layer 12 may be produced, for example, by applying an ink onto a support body and drying it, the ink containing the flakes 12F made of a pulverized product of a cholesteric resin layer, a solvent, and a binder, and, if necessary, an optional component.

As a solvent, for example, an inorganic solvent such as water may be used, although an organic solvent is usually used. Examples of the organic solvents may include organic solvents such as ketones, alkyl halides, amides, sulfoxides, heterocyclic compounds, hydrocarbons, esters, and ethers. Among these, ketones are preferable when the environmental load is considered. As the solvents, one type thereof may be solely used, and two or more types thereof may also be used in combination at any ratio.

The amount of the solvent is usually 40 parts by weight or more, preferably 60 parts by weight or more, and more preferably 80 parts by weight or more, and is usually 1,000 parts by weight or less, preferably 800 parts by weight or less, and more preferably 600 parts by weight or less, relative to 100 parts by weight of the pulverized product of the cholesteric resin layer. By setting the amount of the solvent to fall within the foregoing range, coatability of the ink can be improved.

As the binder, a polymer is usually used. Examples of the polymers may include a polyester-based polymer, an acrylic polymer, a polystyrene-based polymer, a polyamide-based polymer, a polyurethane-based polymer, a polyolefin-based polymer, a polycarbonate-based polymer, and a polyvinyl-based polymer. As the binders, one type thereof may be solely used, and two or more types thereof may also be used in combination at any ratio.

The amount of the binder is usually 20 parts by weight or more, preferably 40 parts by weight or more, and more preferably 60 parts by weight or more, and is usually 1,000 parts by weight or less, preferably 800 parts by weight or less, and more preferably 600 parts by weight or less, relative to 100 parts by weight of the pulverized product of the cholesteric resin layer. By setting the amount of the binder to fall within the foregoing range, application ability of the ink can be improved. Further, it is possible to stably fix the pulverized product of the cholesteric resin layer in the second layer.

Examples of the optional components that the ink may contain may include an antioxidant, a ultraviolet absorber, a light stabilizer, and a blueing agent. As the optional components, one type thereof may be solely used, and two or more types thereof may also be used in combination at any ratio.

In this embodiment, printing with the above-described ink on the first layer 11 in the shape of a pattern of characters is performed, and then the ink is dried, to thereby obtain a second layer 12 as a layer containing the flakes 12F constituted of a pulverized product of a cholesteric resin layer.

The ink may include, instead of or in combination with a polymer as the binder, a monomer of the polymer. In this case, the second layer including the flakes constituted of the pulverized product of the cholesteric resin layer and the binder can be produced by applying the ink onto the support body and drying the ink, and then polymerizing the monomer. However, when a monomer is contained, it is preferable that the ink contains a polymerization initiator.

(Tackiness Layer)

A tackiness layer 15 is provided on the lower surface of the first layer 11 illustrated in FIG. 3. The tackiness layer 15 is a layer that bonds the first layer 11 and the substrate layer 14. In the present invention, the tackiness layer is an optional layer. As the tackiness layer 15, for example, a layer of a tackiness composition containing a polymer exhibiting tackiness (hereinafter, sometimes simply referred to as "main polymer") may be used. As such a tackiness composition, the tackiness composition described in Japanese Patent No. 6067667 B may be used.

The thickness of the tackiness layer 15 is preferably 5 μm or more, and more preferably 10 μm or more, and is preferably 100 μm or less, and more preferably 50 μm or less. By setting the thickness of the tackiness layer to be equal to or more than the lower limit value, high adhesive strength can be obtained. By setting the thickness of the tackiness layer to be equal to or less than the upper limit value, optical performance such as transmittance can be improved.

The visible light transmittance of the tackiness layer 15 in a wavelength range of 450 nm to 650 nm is preferably 80% or more, and more preferably 85% or more.

(Substrate Layer)

In this embodiment, the substrate layer 14 is a layer which is bonded to the first layer 11 via the tackiness layer 15. Examples of the substrate layer 14 may include a film and a sheet made of plastic such as a vinyl chloride sheet and an acrylic resin sheet.

The thickness of the substrate layer 14 is preferably 50 μm or more, and more preferably 100 μm or more, and is preferably 2,000 μm or less, and more preferably 1,000 μm or less. By setting the thickness of the substrate layer to be equal to or more than the lower limit value, the strength of the identification medium can be increased. By setting the thickness of the substrate layer to be equal to or less than the upper limit value, the optical performance such as transmittance can be improved.

The visible light transmittance of the substrate layer 14 is preferably 80% or more, and more preferably 85% or more. From the viewpoint of maintaining the circular polarized state of the first layer 11, the in-plane retardation of the substrate layer 14 is preferably 20 nm or less, more preferably 10 nm or less, and ideally 0.

(Article Including Identification Medium)

Examples of an article including the identification medium 10 may include booklets such as passports, tags of commodities such as clothing, and packages of commodities such as pharmaceuticals and cosmetics.

(Method for Determining Authenticity)

The method for determining authenticity of the identification medium 10 according to the present embodiment includes: a first step of observing, from the second layer 12 side, reflected light of light for irradiation of the identification medium 10 from the second layer 12 side and determining whether or not information by the second layer 12 can be visually recognized; and a second step of observing, from a side that is opposite to the second layer side, reflected light of light for irradiation of the identification medium 10 from the side that is opposite to the second layer side and determining whether or not the information by the second layer 12 can be visually recognized. The "side that is opposite to the second layer side" in the case of the identification medium 10 is the first layer 11 side. As another example, when the identification medium has a layer structure of (first layer)/(second layer)/(layer X as optional component), the "side that is opposite to the second layer side" of the identification medium is the side of the layer X of the identification medium.

The method for determining authenticity of the identification medium 10 will be described with reference to FIG. 4 to FIG. 9. In the following description, an example in which the first layer 11 reflects clockwise circular polarized light (corresponding to one of clockwise circular polarized light and counterclockwise circular polarized light) and allows the remaining circular polarized light to pass therethrough will be described. In this example, the second layer 12 is a layer that reflects at least a portion of clockwise circular polarized light (circular polarized light having the same rotation direction as that of circular polarized light that the first layer reflects) and allows counterclockwise circular polarized light to pass therethrough (does not reflect counterclockwise circular polarized light).

An example in which the identification medium 10 of the present embodiment is used to a part of a booklet 20 (article) such as a passport will be described. As illustrated in FIG. 5 and FIG. 7, the identification medium 10 is disposed to a part of an n'th leaf 21 of the booklet. The identification medium 10 is placed such that the second layer 12 is disposed on a side facing an "n−1"th leaf 23 of the booklet, and the substrate layer 14 is disposed on a side facing an "n+1"th leaf 22 of the booklet. A surface 21A on the second layer 12 side of the n'th leaf 21 (a portion including the identification medium) of the booklet is a surface to be stacked on the "n−1"th leaf 23 of the booklet. A surface 21B on the substrate layer 14 side of the n'th leaf 21 of the booklet is a surface to be stacked on the "n+1"th leaf 22 of the booklet.

As illustrated in FIG. 5 and FIG. 7, the character information "Genuine" is printed in an area 23A on which the identification medium 10 is to be stacked, on the "n−1"th leaf 23 of the booklet. Also, the character information "SECURITY" is printed in an area 22A on which the identification medium 10 is to be stacked, on the "n+1"th leaf 22 of the booklet.

In the first step of the present embodiment, the identification medium 10 is stacked on the "n+1"th leaf 22 of the booklet such that the second layer 12 is disposed on the upper side, and the identification medium 10 is observed from the second layer 12 side to determine whether or not the information by the second layer 12 can be visually recognized.

In the second step of the present embodiment, the identification medium 10 is stacked on the "n−1"th leaf 23 of the booklet such that the first layer 11 is disposed on the upper side, and the identification medium 10 is observed from the first layer 11 side to determine whether or not the information by the second layer 12 can be visually recognized.

When the information by the second layer 12 can be visually recognized in the first step, and the information by the second layer cannot be visually recognized in the second step, it can be determined that the article (booklet) including the identification medium 10 is authentic.

In addition to the first step and the second step, a step of confirming transparency (transparent, translucent, or opaque) of the identification medium 10 may be performed. The step of confirming transparency can be performed by the following manner.

Information such as a character and a picture is previously printed on a base (the "n+1"th leaf 22 and the "n−1"th leaf 23 in the present embodiment) on which the identification medium 10 is to be stacked, and the information printed on the base is observed through the identification medium 10. When the information is visible, it can be confirmed that the identification medium 10 is transparent or translucent. In the present embodiment, it can be confirmed that the identification medium 10 is transparent or translucent, when the character information "SECURITY" on the "n+1"th leaf 22 of the booklet and the character information "Genuine" on the "n−1"th leaf 23 of the booklet are visible.

Functions and Effects of Present Embodiment

The functions of the identification of authenticity by the identification medium 10 of the present embodiment will be described. Although an actual identification medium may cause various absorptions and reflections other than those described later, a main path of light will be schematically described in the following description for convenience of the explanation of functions. In FIG. 6 and FIG. 9, a tackiness layer and a substrate layer are omitted, and layers are illustrated in a separated manner.

As illustrated in FIG. 5 and FIG. 6, a case where the identification medium 10, which is stacked on a base 22 (the "n+1"th leaf 22 of the booklet) such that the second layer 12 is disposed on the upper side, is observed from the second layer 12 side by the naked eye will be described.

The second layer 12 is a layer that reflects at least a portion of clockwise circular polarized light and does not reflect or hardly reflects counterclockwise circular polarized light. Therefore, as illustrated in FIG. 6, a portion of clockwise circular polarized light, of non-polarized light A1 such as natural light, is reflected by the second layer 12 and visually recognized as backscattered light A2R. Accordingly, the information of the second layer 12 can be visually recognized.

Of the non-polarized light A1, counterclockwise circular polarized light A1L and a portion of clockwise circular polarized light A1R pass through the second layer 12. The clockwise circular polarized light A1R having passed through the second layer 12 is reflected as clockwise circular polarized light A3R by the first layer 11. The counterclockwise circular polarized light A1L having passed through the second layer 12 passes through the first layer 11. The counterclockwise circular polarized light A1L having passed through the first layer 11 is reflected as non-polarized light A4 by the base 22. A portion of the non-polarized light A4 is reflected as clockwise circular polarized light A5R by the first layer 11. Of the non-polarized light A4 reflected by the base 22, counterclockwise circular polarized light A4 sequentially passes through the first layer 11 and the second layer and exits out of the identification medium 10.

Subsequently, as illustrated in FIG. 7 and FIG. 8, a case where the identification medium 10, which is stacked on a base 23 (the "n−1"th leaf of the booklet) such that the first layer 11 is disposed on the upper side, is observed from the first layer 11 side by the naked eye will be described.

The first layer 11 is a layer that is capable of reflecting clockwise circular polarized light and allowing counterclockwise circular polarized light to pass therethrough. Therefore, as illustrated in FIG. 9, clockwise circular polarized light, of non-polarized light A1 such as natural light, is reflected as specularly reflected light A2R by the first layer 11, and counterclockwise circular polarized light A1L passes through the first layer 11. The counterclockwise circular polarized light A1L having passed through the first layer 11 passes through the second layer 12 and is reflected as non-polarized light A4 by the base 23. Of the non-polarized light A4, clockwise circular polarized light is reflected as backscattered light A5R by the second layer 12. However, since the reflected light travels in the direction toward the base 23, the information of the second layer 12 cannot be visually recognized from the upper side. Of the non-polarized light A4, counterclockwise circular polarized light sequentially passes through the second layer 12 and the first layer 11 and exits out of the identification medium 10.

In this manner, as to an article including the identification medium 10 of the present embodiment, information of the second layer 12 can be visually recognized when observed from the second layer 12 side and cannot be visually recognized when observed from the first layer 11 side. Therefore, it can be determined that an article including the identification medium 10 is authentic.

According to the present embodiment, whether or not the identification medium 10 is authentic can be identified by the naked eye. Therefore, authenticity can be determined without using a special viewer. Thus, according to the present invention, there can be provided an identification medium with which authenticity can be determined without using a special viewer, a method for determining authenticity of an identification medium, and an article including the identification medium.

Embodiment 2

Hereinafter, the identification medium according to Embodiment 2 of the present invention will be described with reference to FIG. 10 to FIG. 19.

Figure 10:
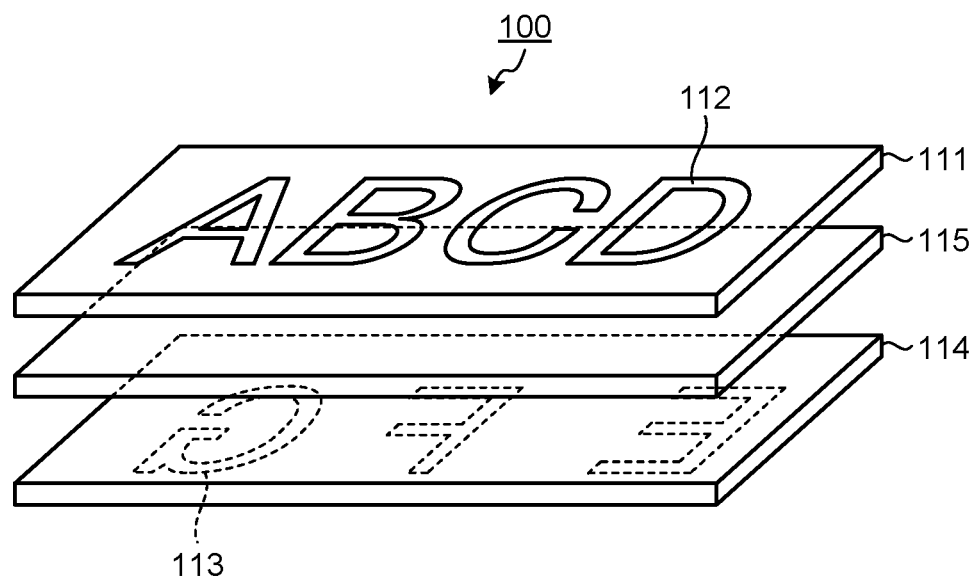
FIG. 10 is an exploded perspective view schematically illustrating an identification medium according to Embodiment 2.
Figure 11:
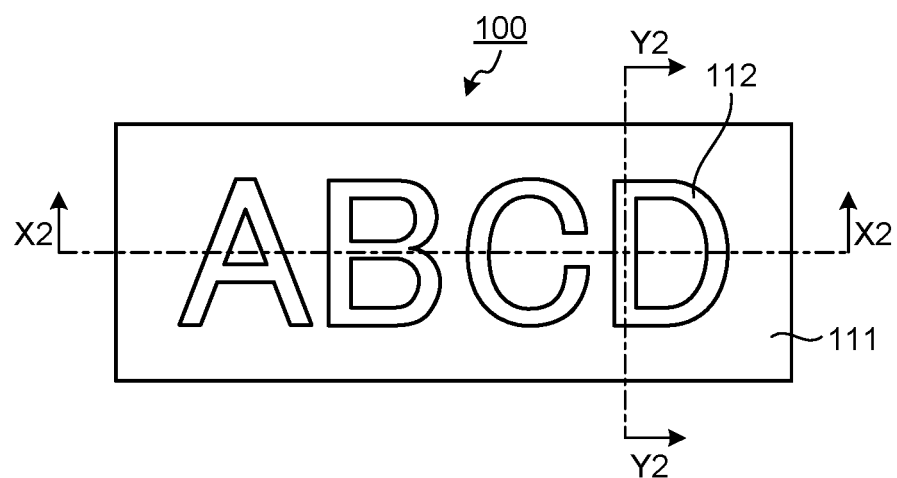
FIG. 11 is a plan view schematically illustrating the identification medium of Embodiment 2 from a second layer side.
Figure 12:
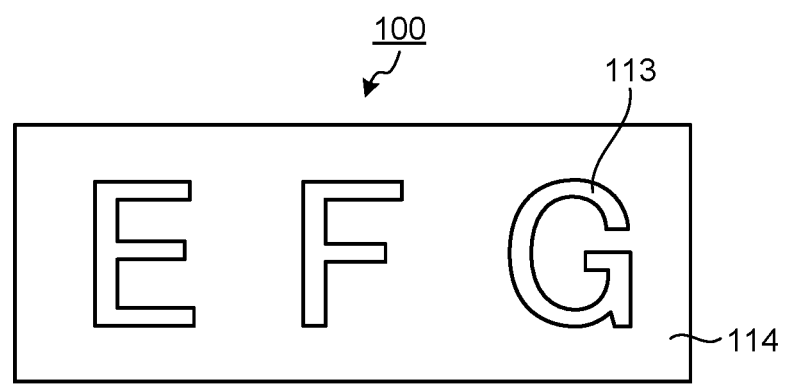
FIG. 12 is a plan view schematically illustrating the identification medium of Embodiment 2 from a third layer side.
Figure 13:
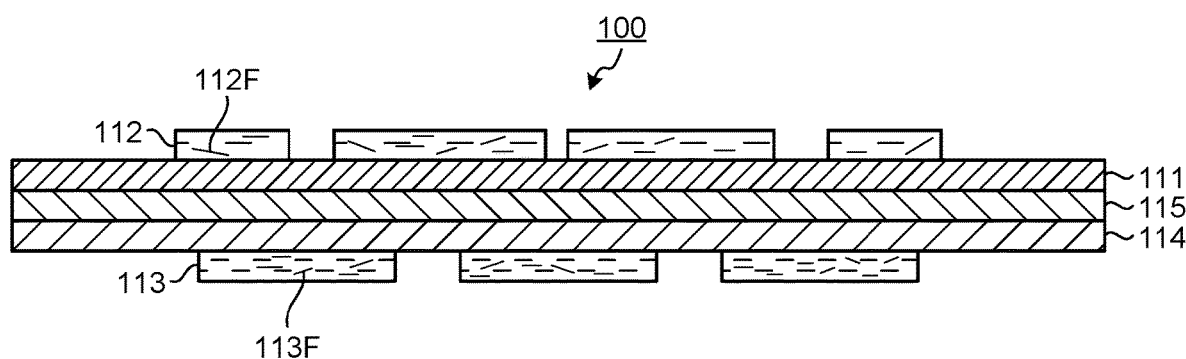
FIG. 13 is a cross-sectional view schematically illustrating a cross section in the X2-X2 direction of FIG. 11.
Figure 14:
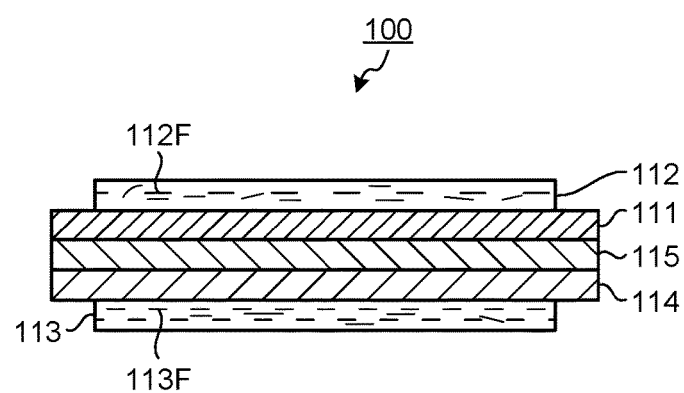
FIG. 14 is a cross-sectional view schematically illustrating a cross section in the Y2-Y2 direction of FIG. 11.
Figure 15:
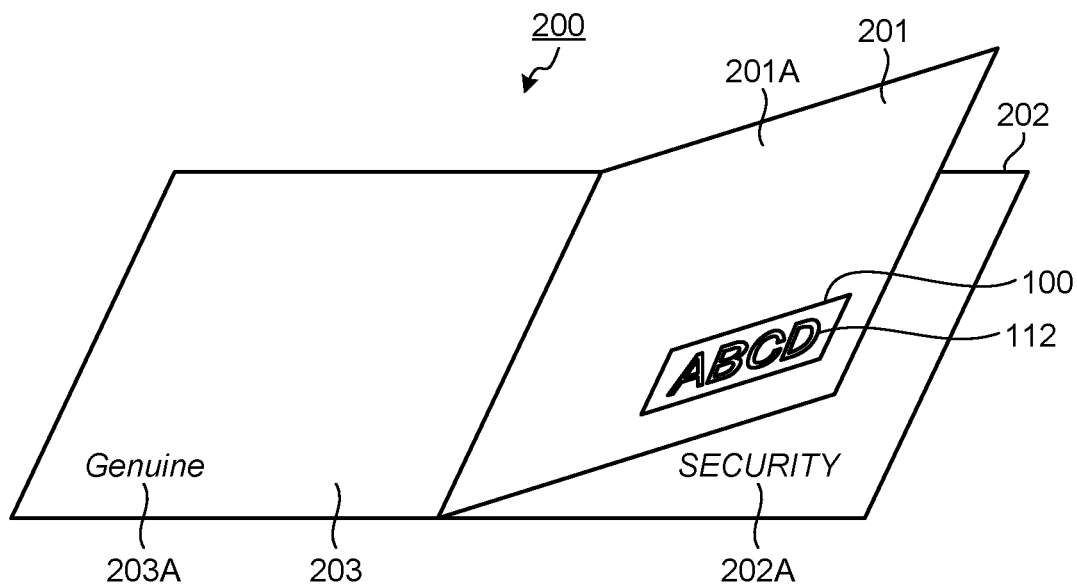
FIG. 15 is a perspective view schematically illustrating an article in which a second layer is disposed on the upper side.
Figure 16:
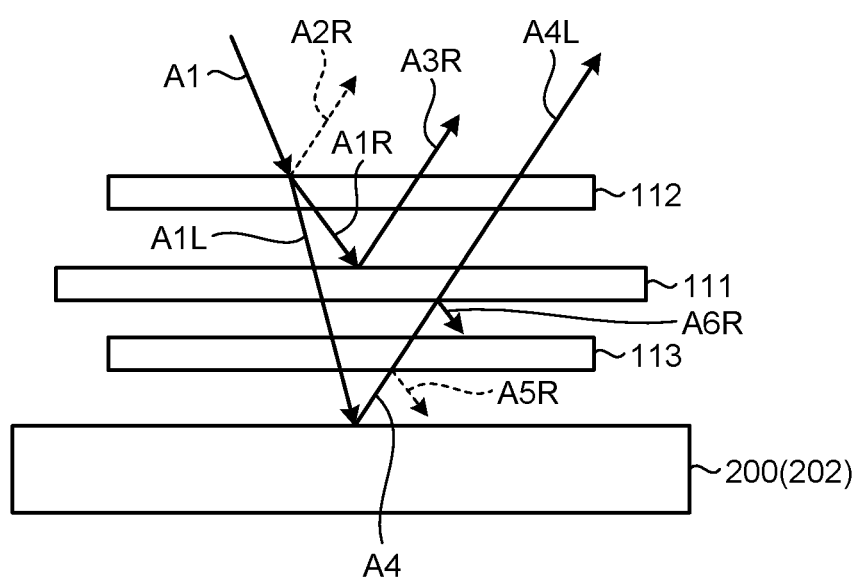
FIG. 16 is an exploded cross-sectional view schematically illustrating a path of light in a case wherein the identification medium is irradiated with the light from the second layer side.
Figure 17:
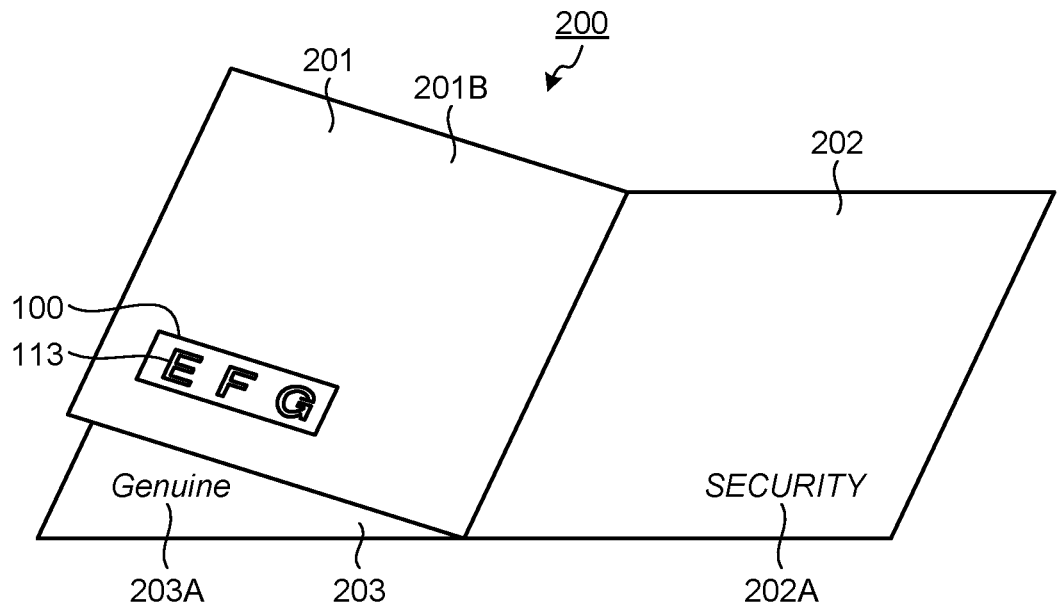
FIG. 17 is a perspective view schematically illustrating an article in which a third layer is disposed on the upper side.
Figure 18:
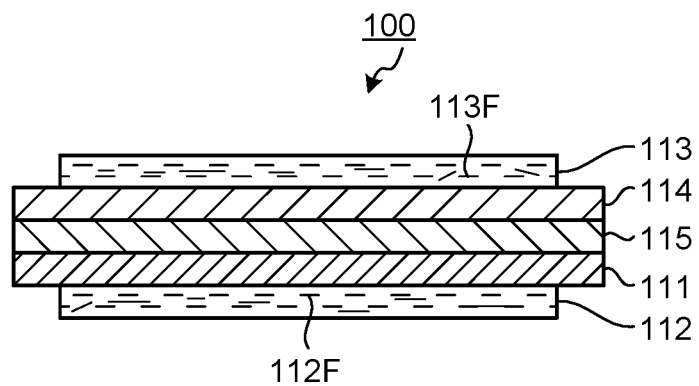
FIG. 18 is a cross-sectional view schematically illustrating the identification medium of FIG. 14 which is flipped upside down.
Figure 19:
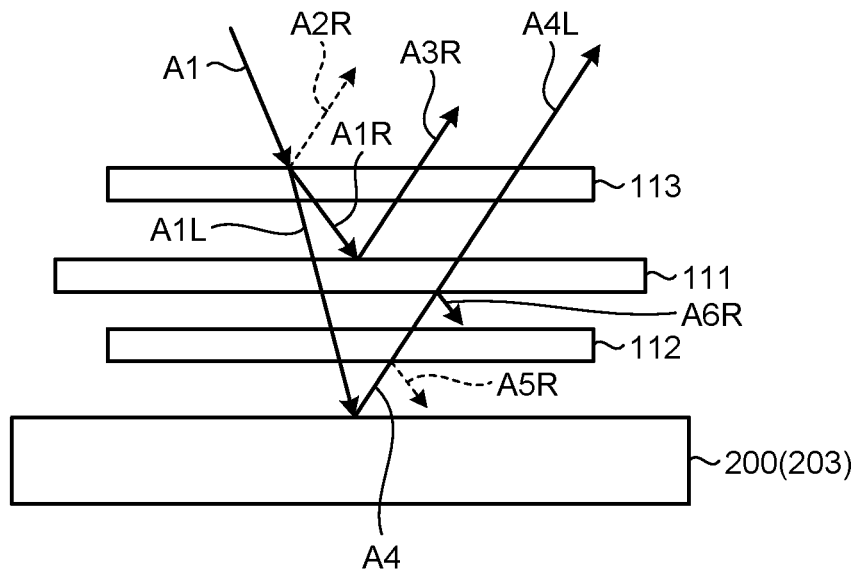
FIG. 19 is an exploded cross-sectional view schematically illustrating a path of light in a case wherein the identification medium is irradiated with the light from the third layer side.

FIG. 10 is an exploded perspective view schematically illustrating an identification medium according to Embodiment 2. FIG. 11 is a plan view schematically illustrating the identification medium of Embodiment 2 from a second layer side. FIG. 12 is a plan view schematically illustrating the identification medium of Embodiment 2 from a third layer side. FIG. 13 is a cross-sectional view schematically illustrating a cross section in the X2-X2 direction of FIG. 11. FIG. 14 is a cross-sectional view schematically illustrating a cross section in the Y2-Y2 direction of FIG. 11. FIG. 15 is a perspective view schematically illustrating an article in which a second layer is disposed on the upper side. FIG. 16 is an exploded perspective view schematically illustrating a path of light in a case wherein the identification medium is irradiated with the light from a second layer side. FIG. 17 is a perspective view schematically illustrating an article in which a third layer is disposed on the upper side. FIG. 18 is a cross-sectional view schematically illustrating the identification medium of FIG. 14 which is flipped upside down. FIG. 19 is an exploded perspective view schematically illustrating a path of light in a case wherein the identification medium is irradiated with the light from a third layer side.

The identification medium 100 of the present embodiment differs from that of Embodiment 1 in that it includes a third layer disposed on the first layer on a surface opposite to a surface on which the second layer is disposed, such that the third layer overlaps with the first layer.

The identification medium 100 of the present embodiment is an embodiment in which a third layer is disposed on the substrate layer of the identification medium 10 according to Embodiment 1. That is, a first layer 111, a second layer 112, a tackiness layer 115, and a substrate layer 114 of the identification medium 100 according to the present embodiment correspond to the first layer 11, the second layer 12, the tackiness layer 15, and the substrate layer 14 of the identification medium 10 according to Embodiment 1, respectively. In the following description, a difference from Embodiment 1 will be mainly described.

(Outline of Identification Medium 100)

As illustrated in FIG. 10 to FIG. 13, the identification medium 100 of the present embodiment includes the first layer 111 and the second layer 112 disposed thereon in a manner of overlapping with the first layer 111. As illustrated in FIG. 13, the identification medium 100 includes the tackiness layer 115, the substrate layer 114, and a third layer 113 on the lower surface (a surface opposite to a surface on which the second layer 112 is disposed) of the first layer 111. Hereinafter, the third layer 113 will be described.

(Third Layer)

In the present embodiment, the third layer 113 is a layer that is (indirectly) disposed on the lower surface of the first layer 111 through the tackiness layer 115 and the substrate layer 114. The third layer may be directly disposed in an overlapping manner on a surface of the first layer that is opposite to a surface on which the second layer is disposed.

The third layer 113 is a layer that is capable of allowing to pass therethrough circular polarized light having the opposite rotation direction to that of the circular polarized light that the first layer reflects, that is, a layer that does not reflect or hardly reflects circular polarized light having the opposite rotation direction to that of circular polarized light that the first layer reflects. In the present embodiment, the third layer 113 is directly formed on the lower surface (in FIG. 10 and FIG. 13) of the substrate layer 114 as portions corresponding to the character pattern "EFG" (see FIG. 12). The third layer 113 is formed in an overlapping manner in a position such that the entire region thereof is on the first layer 111.

(Relationship Between Reflection Ratio of First Layer and Reflection Ratio of Third Layer)

In the identification medium 100 of the present embodiment, a ratio ($Ssf_3/S_3$) of $Ssf_3$ defined by the following formula (4) relative to $S_3$ defined by the formula (3) is more than 0.7.

$$S_3 = \int_{400}^{780} \{(Rf_3(\lambda)) * (Rf_3(\lambda))\}^{\wedge}(1/2) \cdot d\lambda \quad (3)$$

In the formula (3), $Rf_3(\lambda)$ represents a reflection ratio at a wavelength ($\lambda$) of the third layer. The $S_3$ value defined by the formula (3) is an integrated value of a reflection ratio $Rf_3$ of the third layer.

$$Ssf_3 = \int_{400}^{780} \{(Rs(\lambda)) * (Rf_3(\lambda))\}^{\wedge}(1/2) \cdot d\lambda \quad (4)$$

The $Ssf_3$ value defined by the formula (4) is an integrated value of a square root of the product of a reflection ratio Rs of the first layer and a reflection ratio $Rf_3$ of the third layer in a wavelength range of 400 nm to 780 nm.

$Rs(\lambda)$ and $Rf_3(\lambda)$ are a reflection ratio when non-polarized light at a wavelength ($\lambda$) in a wavelength range of 400 nm to 780 nm enters a target layer. The reflection ratio may be measured using, for example, a UV-visible spectrophotometer (UV-Vis 550, manufactured by JASCO Corporation). A value measured by the spectrophotometer may involve an interface reflection component. In such a case, the interface reflection component is subtracted to calculate reflection ratios Rs ($\lambda$) and $Rf_3(\lambda)$.

When $Ssf_3/S_3$ is more than 0.7, observation of the identification medium from the third layer side results in visual recognizability of the information of the third layer by the naked eye, although observation of the flipped identification medium from the second layer side results in the lack of visual recognizability of the information of the third layer. Therefore, this is effective for the determination of authenticity. The $Ssf_3/S_3$ value is preferably 0.75 or more, and more preferably 1.0 or more. When the $Ssf_3/S_3$ value is 1.0 or more, there becomes almost no difference among individuals in the determination on whether or not information is visually recognized, and thus determination can be performed objectively. The upper limit value of the $Ssf_3/S_3$ value may be preferably 5 or less, and more preferably 3 or less, although not particularly limited thereto. By setting the $Ssf_3/S_3$ value to fall within such a range, the character pattern of the third layer can be visually recognized in a favorable manner.

The third layer 113 is preferably a layer that contains flakes of a resin having cholesteric regularity (also referred to as a "cholesteric resin"), in the same manner as the flakes 112F contained in the second layer 112. The flakes to be used may be the flakes described for the second layer 12 of Embodiment 1.

(Relationship Between Reflected Light by Second Layer and Reflected Light by Third Layer)

The wavelength of reflected light by the second layer and the wavelength of reflected light by the third layer each fall within the visible light region, and a difference ΔE' between a hue by reflected light by the second layer and a hue by reflected light by the third layer is preferably 10 or more, more preferably 30 or more, and particularly preferably 50 or more. The ΔE' equal to or more than the lower limit value is preferable, because a difference in reflection color between the second layer and the third layer can be easily confirmed by visual observation, reproduction and forgery of the identification medium can become further difficult, and design properties by a clear difference in color can be imparted. The upper limit of ΔE' may be, for example, 140.

The hue difference ΔE' may be quantitatively evaluated using a color difference meter. As the color system for the quantitative evaluation, any optional system may be adopted. Examples thereof may include the XYZ color system and the L*a*b* color system.

For the present embodiment, the third layer 113 may be produced by, for example, applying an ink onto a support body and drying it, the ink containing flakes 113F constituted of a pulverized product of the cholesteric resin layer, a solvent, a binder, and, if necessary, an optional component. As the ink for producing the third layer 113, the ink for producing the second layer 112 (the second layer 12 of Embodiment 1) may be used.

In the present embodiment, printing with the above-described ink on the substrate layer 114 (the substrate layer 14 of the identification medium of Embodiment 1) in the shape of characters is performed, and then the ink is dried, to thereby obtain the third layer 113 as a layer containing the flakes 113F constituted of a pulverized product of the cholesteric resin layer.

(Method for Determining Authenticity)

The method for determining authenticity of the identification medium 100 according to the present embodiment includes: a third step of observing, from the second layer 112 side, reflected light of light for irradiation of the identification medium 100 from the second layer 112 side and determining whether or not information by the second layer 112 and information 113 by the third layer can be visually recognized; and a fourth step of observing, from the third layer 113 side, reflected light of light for irradiation of the identification medium 100 from the third layer 113 side and determining whether or not the information by the second layer 112 and the information by the third layer 113 can be visually recognized.

The method for determining authenticity of the identification medium 100 will be specifically described with reference to FIG. 14 to FIG. 19. In the following description, an example in which the first layer 111 reflects clockwise circular polarized light (corresponding to one of clockwise circular polarized light and counterclockwise circular polarized light) and allows the remaining circular polarized light to pass therethrough will be described. In this example, the second layer 112 is a layer that is capable of reflecting at least a portion of clockwise circular polarized light (circular polarized light having the same rotation direction as that of circular polarized light that the first layer reflects) and allowing to pass therethrough counterclockwise circular polarized light (a layer that does not reflect or hardly reflects counterclockwise circular polarized light). Also, the third layer 113 is a layer that is capable of allowing counterclockwise circular polarized light to pass therethrough (a layer that does not reflect or hardly reflects counterclockwise circular polarized light).

An example in which the identification medium 100 of the present embodiment is used to a part of a booklet 200 such as a passport in the same manner as that in Embodiment 1 will be described. As illustrated in FIG. 15 and FIG. 17, the identification medium 100 is disposed to a part of an n'th leaf 201 of the booklet. The identification medium 100 is placed such that the second layer 112 is disposed on a side facing an "n−1"th leaf 203 of the booklet, and the third layer 113 is disposed on a side facing an "n+1"th leaf 202 of the booklet. A surface 201A on the second layer 112 side of the n'th leaf 201 (a portion including the identification medium) of the booklet is a surface to be stacked on the "n−1"th leaf 203 of the booklet. A surface 201B on the third layer 113 side of the n'th leaf 201 of the booklet is a surface to be stacked on the "n+1"th leaf 202 of the booklet.

As illustrated in FIG. 15 and FIG. 17, the character information "Genuine" is printed in an area 203A on which the identification medium 100 is to be stacked, on the "n−1"th leaf 203 of the booklet. Also, the character information "SECURITY" is printed in an area 202A on which the identification medium 100 is to be stacked, on the "n+1"th leaf 202 of the booklet.

In the third step of the present embodiment, the identification medium 100 is stacked on the "n+1"th leaf 202 of the booklet such that the second layer 112 is disposed on the upper side, and the identification medium 100 is observed from the second layer 112 side to determine whether or not the information by the second layer 112 and the information by the third layer 113 are visually recognized.

In the fourth step of the present embodiment, the identification medium 10 is stacked on the "n−1"th leaf 203 of the booklet such that the third layer 113 is disposed on the upper side, and the identification medium 100 is observed from the third layer 113 side to determine whether or not the information by the second layer 112 and the information by the third layer 113 can be visually recognized.

When only the information by the second layer 112 can be visually recognized in the third step, and the information by the third layer 113 can be visually recognized in the fourth step, it can be determined that the article (booklet) including the identification medium 100 is authentic.

In addition to the third step and the fourth step, a step of confirming transparency (transparent, translucent, or opaque) of the identification medium 100 may also be performed in the present embodiment. The step of confirming transparency may be performed by the same method as that of Embodiment 1.

Functions and Effects of Present Embodiment

The functions of the identification of authenticity by the identification medium 100 according to the present embodiment will be described. Although an actual identification medium may cause various absorptions and reflections other than those described later, a main path of light will be schematically described in the following description for convenience of the explanation of functions.

In FIG. 16 and FIG. 19, a tackiness layer and a substrate layer are omitted, and layers are illustrated in a separated manner.

As illustrated in FIG. 15 and FIG. 16, a case where the identification medium 100, which is stacked on a base 202 (an "n+1"th leaf of the booklet) such that the second layer 112 is disposed on the upper side, is observed from the second layer 112 side by the naked eye will be described.

The second layer 112 is a layer that reflects at least a portion of clockwise circular polarized light and that does not reflect or hardly reflects counterclockwise circular polarized light. Therefore, as illustrated in FIG. 16, a portion of clockwise circular polarized light, of non-polarized light A1 such as natural light, is reflected by the second layer 12 and visually recognized as backscattered light A2R. Accordingly, the information of the second layer 12 can be visually recognized.

Of the non-polarized light A1, counterclockwise circular polarized light A1L and a portion of clockwise circular polarized light A1R pass through the second layer 112. The clockwise circular polarized light A1R having passed through the second layer 112 is reflected as clockwise circular polarized light A3R by the first layer 111. The counterclockwise circular polarized light A1L having passed through the second layer 112 passes through the first layer 111 and the third layer 113. The counterclockwise circular polarized light A1L having passed through the first layer 111 and the third layer 113 is reflected as non-polarized light A4 by the base 202. A portion of the non-polarized light A4 is reflected as clockwise circular polarized light A5R by the third layer 114. Of the non-polarized light A4 reflected by the base 202, counterclockwise circular polarized light A4 sequentially passes through the third layer 113, the first layer 111, and the second layer 112 and exits out of the identification medium 100.

Subsequently, as illustrated in FIG. 18 and FIG. 19, a case where the identification medium 100, which is stacked on a base 203 (an "n−1"th leaf of the booklet) such that the third layer 113 is disposed on the upper side, is observed from the third layer 113 side by the naked eye will be described.

The third layer 113 is a layer that does not reflect or hardly reflect counterclockwise circular polarized light. Therefore, as illustrated in FIG. 19, a portion of clockwise circular polarized light, of non-polarized light A1 such as natural light, is reflected by the third layer 113 and visually recognized as backscattered light A2R. Accordingly, the information of the second layer 12 can be visually recognized. A portion of clockwise circular polarized light having passed through the third layer 113 is reflected as specularly reflected light A2R by the first layer 111.

Of the non-polarized light A1, counterclockwise circular polarized light A1L is not reflected by the third layer 113 and passes through the third layer 113, the first layer 111, and the second layer. The counterclockwise circular polarized light A1L having passed through the third layer 113, the first layer 111, and the second layer 112 is reflected as non-polarized light A4 by the base 203.

Of the non-polarized light A4, clockwise circular polarized light is reflected as backscattered light A5R by the second layer 112. The reflected light travels in the direction toward the base 203. When the reflected light is strong, the information of the second layer 112 cannot be visually recognized from the upper side. Of the non-polarized light A4, counterclockwise circular polarized light sequentially passes through the second layer 112, the first layer 111, and the third layer 113 and exits out of the identification medium 100.

In this manner, as to the article including the identification medium 100 of the present embodiment, the information of the second layer 12 can be visually recognized when observed from the second layer 112 side. When the identification medium 100 is observed from the third layer 113 side, the information of the third layer 113 can be visually recognized, but the information of the second layer 112 cannot be visually recognized. Therefore, the identification medium having such an observation result can be determined to be an article including the authentic identification medium 100.

According to the present embodiment, whether or not the identification medium 100 is authentic can also be identified by the naked eye. Therefore, authenticity can be determined without using a special viewer. Thus, according to the present invention, there can be provided an identification medium with which authenticity can be determined without using a special viewer, a method for determining authenticity of an identification medium, and an article including the identification medium.

Furthermore, according to the present embodiment, the second layer 112 and the third layer 113 can have different information from each other. Accordingly, authenticity can be further clearly determined, and a forgery prevention effect can be enhanced.

Other Embodiments

Although the second layer and the third layer were formed by a method of printing a character pattern with an ink containing flakes of the cholesteric resin in the aforementioned embodiment, the method for forming the second layer and the third layer is not limited thereto. The second layer and the third layer may be formed by a method of printing a figure shape with an ink containing flakes and a method of molding a dispersion containing flakes into a layered shape by extrusion, solvent casting, or the like.

EXAMPLES

Hereinafter, the present invention will be specifically described by illustrating Examples. However, the present invention is not limited to the following Examples, and may be freely modified for implementation without departing from the scope of claims of the present invention and the scope of their equivalents.

In the following description, "%" and "part" representing quantity are on the basis of weight, unless otherwise specified. The operations described below were performed under the conditions of normal temperature and normal pressure in the atmospheric air, unless otherwise specified.

[Description of Reagents]

The reagents used in the following Examples and Comparative Examples are as follows.

As the photopolymerizable liquid crystal compound 1, a compound having the following structure was used.

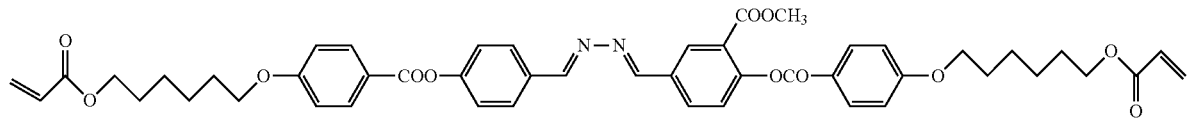

Photopolymerizable Liquid Crystal Compound 1

As the photopolymerizable liquid crystal compound 2, a compound having the following structure was used.

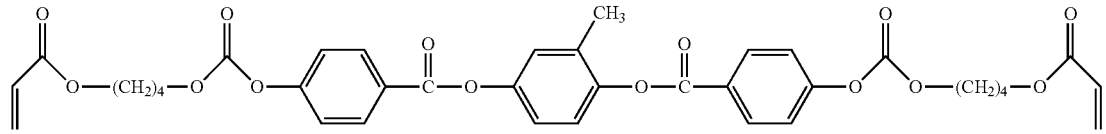

Photopolymerizable Liquid Crystal Compound 2

As the photopolymerizable non-liquid crystal compound, a compound having the following structure was used.

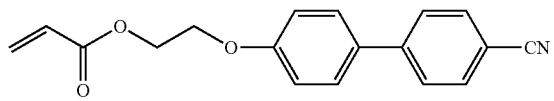

Photopolymerizable Non-Liquid Crystal Compound

As the chiral agent, "LC756" manufactured by BASF was used.

As the photopolymerization initiator, "Irgacure OXE02" manufactured by Ciba Japan KK was used.

As the surfactant, "Ftergent 209F" manufactured by NEOS Co., Ltd. was used.

Examples 1 to 18 and Comparative Examples 1 to 12

1. Production of Multi-Layer Film Including Cholesteric Resin Layer

Using a photocurable liquid crystal composition prepared by the method described below, a cholesteric resin layer for use in the production of identification media of Examples and Comparative Examples was produced. The cholesteric resin layer was used as a first layer in some cases, and was pulverized into flakes to be used as a pigment in a paint for forming a second layer in some other cases.

(Preparation of Photocurable Liquid Crystal Composition)

The photopolymerizable liquid crystal compound 1, photopolymerizable liquid crystal compound 2, photopolymerizable non-liquid crystal compound, chiral agent, photopolymerization initiator, surfactant, and cyclopentanone at the ratios shown in Tables 1 and 2 were mixed to prepare photocurable liquid crystal compositions.

[Production of Multilayer Film Including Cholesteric Resin Layer]

As a support body, a long-length polyethylene terephthalate film having an isotropic in-plane refractive index ("PET film A4100" manufactured by Toyobo Co., Ltd.; thickness 100 μm, referred to as a "PET film" hereinafter) was prepared. This PET film was placed on a feeding part of a film conveyor. While the PET film is conveyed in the long-length direction, the following operation was performed. First, a rubbing treatment was performed in the long-length direction which is parallel to the conveyance direction. Subsequently, the prepared liquid crystal composition was applied onto the rubbing-treated surface using a die coater. Accordingly, a film of the liquid crystal composition in an uncured state was formed on one surface of the PET film. The film of the liquid crystal composition in an uncured state was subjected to orientation treatment at 120° C. for 4 minutes.

The film after the orientation treatment was subjected to the treatment described in Table 1 or Table 2 to obtain a multilayer film including each of cholesteric resin layers A to I.

For the cholesteric resin layers A to E, the film after the orientation treatment was irradiated with ultraviolet rays at 800 mJ/cm² under nitrogen atmosphere to completely cure the film of the liquid crystal composition. Accordingly, there was obtained a multilayer film including the cholesteric resin layer having the thickness shown in Table 1 on one surface of the long-length PET film.

For the cholesteric resin layers F to I, the film after the orientation treatment was subjected to a first ultraviolet irradiation treatment, a first warming treatment, a second ultraviolet irradiation treatment, and a second warming treatment under the conditions shown in Table 2. After that, the film of the liquid crystal composition was irradiated with ultraviolet rays at 800 mJ/cm² under nitrogen atmosphere to completely cure the film of the liquid crystal composition. Accordingly, there was obtained a multilayer film including the cholesteric resin layer having the thickness shown in Table 2 on one surface of the long-length PET film.

TABLE 1

| | | A | B | C | D | E |
|---|---|---|---|---|---|---|
| Photopolymerizable liquid crystal compound 1 (parts) | | — | 21.5 | 22.0 | 21.8 | 21.9 |
| Photopolymerizable liquid crystal compound 2 (parts) | | 27.69 | — | — | — | — |
| Photopolymerizable non-liquid crystal compound (parts) | | — | 5.38 | 5.51 | 5.46 | 5.48 |
| Chiral agent (parts) | | 1.40 | 2.13 | 1.49 | 1.755 | 1.61 |
| Photopolymerization initiator (parts) | | 0.9 | 0.9 | 0.9 | 0.9 | 0.9 |
| Surfactant (parts) | | 0.03 | 0.03 | 0.03 | 0.03 | 0.03 |
| Cyclopentanone (parts) | | 70 | 70 | 70 | 70 | 70 |
| Orientation treatment | Temperature (° C.) | 120 | 120 | 120 | 120 | 120 |
| | Time (minute) | 4 | 4 | 4 | 4 | 4 |
| First ultraviolet irradiation treatment | Light amount (mJ/cm²) | — | — | — | — | — |
| | Time (minute) | — | — | — | — | — |
| First warming treatment | Temperature (° C.) | — | — | — | — | — |
| | Time (minute) | — | — | — | — | — |
| Second ultraviolet irradiation treatment | Light amount (mJ/cm²) | — | — | — | — | — |
| | Time (minute) | — | — | — | — | — |
| Second warming treatment | Temperature (° C.) | — | — | — | — | — |
| | Time (minute) | — | — | — | — | — |
| Complete curing ultraviolet irradiation treatment (mJ/cm²) | | 800 | 800 | 800 | 800 | 800 |
| Film thickness (μm) | | 3 | 3 | 3 | 3 | 3 |

TABLE 2

| | | F | G | H | I |
|---|---|---|---|---|---|
| Photopolymerizable liquid crystal compound 1 (parts) | | 21.9 | 21.67 | 21.9 | 21.9 |
| Photopolymerizable liquid crystal compound 2 (parts) | | — | — | — | — |
| Photopolymerizable non-liquid crystal compound (parts) | | 5.47 | 5.41 | 5.47 | 5.47 |
| Chiral agent (parts) | | 1.69 | 1.96 | 1.69 | 1.69 |
| Photopolymerization initiator (parts) | | 0.9 | 0.9 | 0.9 | 0.9 |
| Surfactant (parts) | | 0.03 | 0.03 | 0.03 | 0.03 |
| Cyclopentanone (parts) | | 70 | 70 | 70 | 70 |
| Oritentation treatment | Temperature (° C.) | 120 | 120 | 120 | 120 |

TABLE 2-continued

|  |  | F | G | H | I |
|---|---|---|---|---|---|
|  | Time (minute) | 4 | 4 | 4 | 4 |
| First ultraviolet irradiation treatment | Light amount (mJ/cm$^2$) | 5 | 8 | 5 | 8 |
|  | Time (minute) | 1 | 1 | 1 | 1 |
| First warming treatment | Temperature (° C.) | 100 | 80 | 100 | 80 |
|  | Time (minute) | 1 | 1 | 1 | 1 |
| Second ultraviolet irradiation treatment | Light amount (mJ/cm$^2$) | 30 | 30 | 25 | 30 |
|  | Time (minute) | 1 | 1 | 1 | 1 |
| Second warming treatment | Temperature (° C.) | 100 | 80 | 80 | 80 |
|  | Time (minute) | 1 | 1 | 1 | 1 |
|  | Complete curing ultraviolet irradiation treatment (mJ/cm$^2$) | 800 | 800 | 800 | 800 |
|  | Film thickness (μm) | 5.2 | 3.5 | 5.0 | 3.5 |

(Measurement of Reflection Ratio of Cholesteric Resin Layer)

The PET film was peeled from the multilayer film to obtain the cholesteric resin layers A to I as monolayer films. The reflection ratio when non-polarized light (wavelength of 400 nm to 780 nm) entered each of the obtained cholesteric resin layers A to I was measured using a UV-visible spectrophotometer (UV-Vis 550, manufactured by JASCO Corporation). The measurement results are illustrated in FIG. 20 to FIG. 23.

Figure 20:
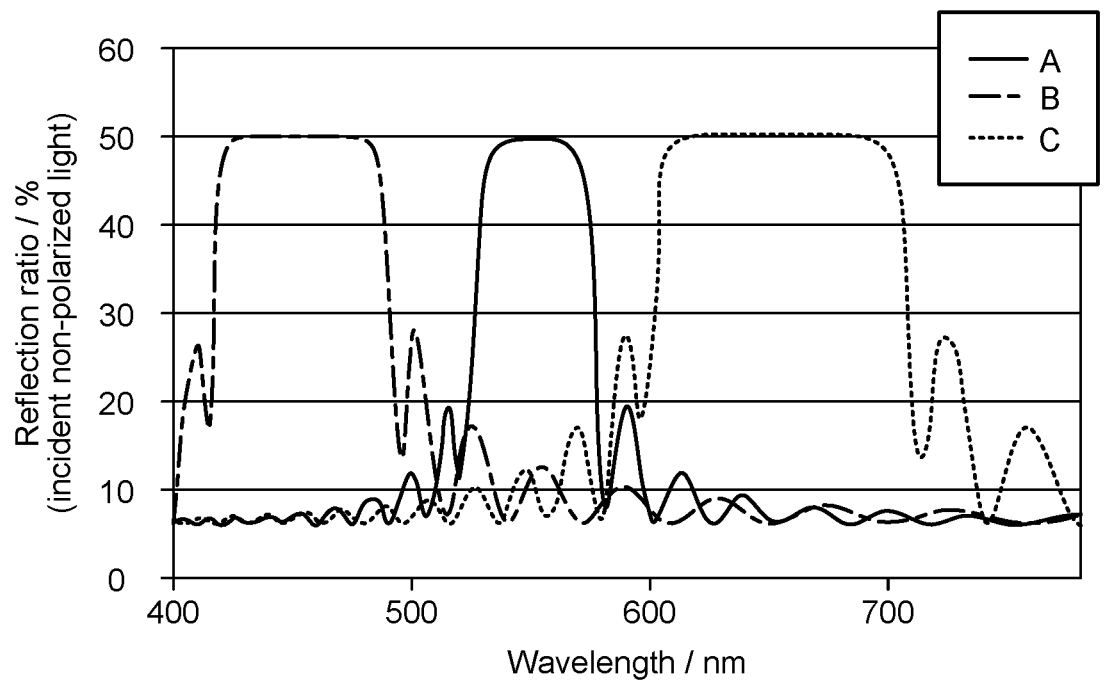
FIG. 20 is a graph illustrating measurement results of a reflection ratio in a wavelength range of 400 nm to 780 nm of cholesteric resin layers A, B and C prepared in Examples.
Figure 21:
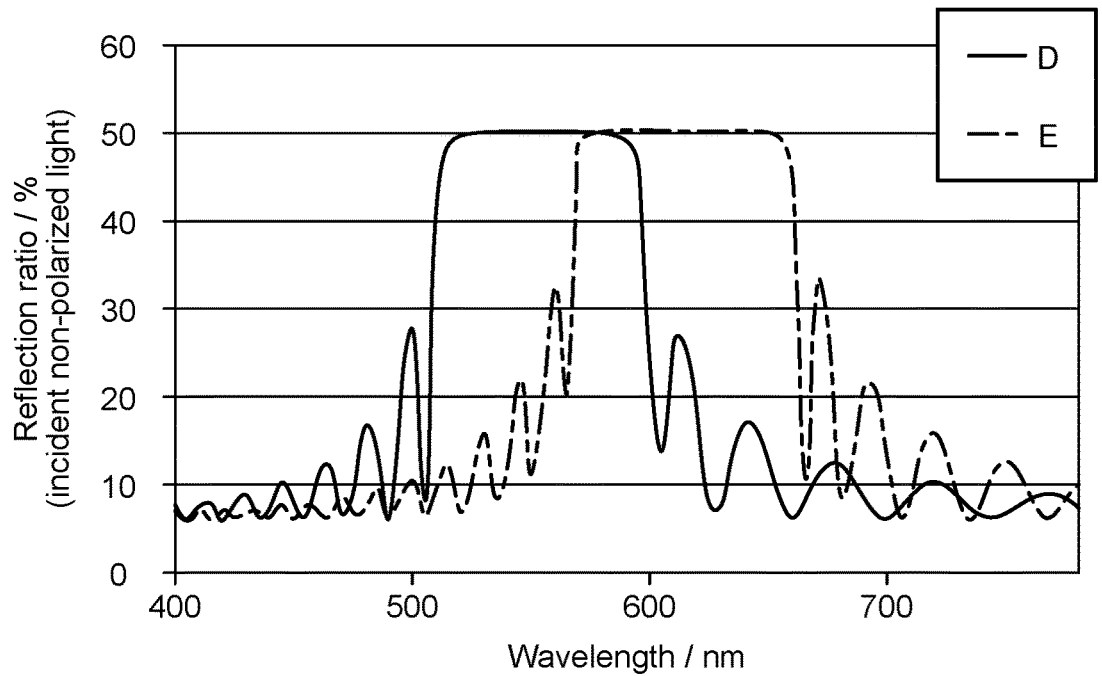
FIG. 21 is a graph illustrating measurement results of a reflection ratio in a wavelength range of 400 nm to 780 nm of cholesteric resin layers D and E prepared in Examples.
Figure 22:
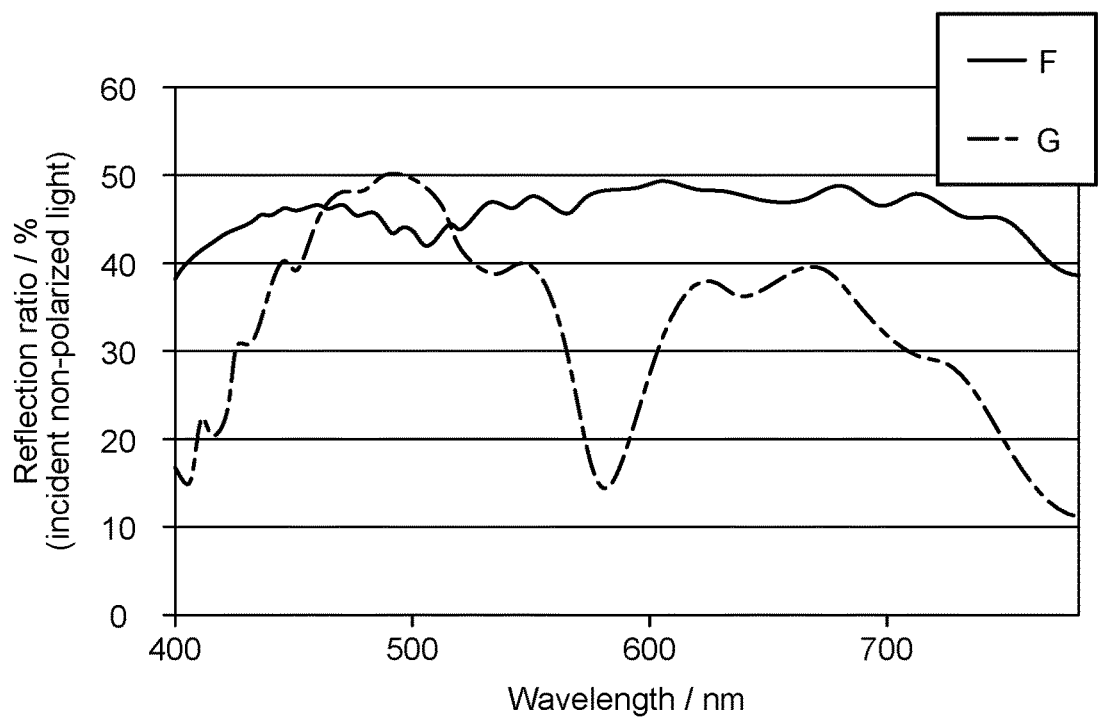
FIG. 22 is a graph illustrating measurement results of a reflection ratio in a wavelength range of 400 nm to 780 nm of cholesteric resin layers F and G prepared in Examples.
Figure 23:
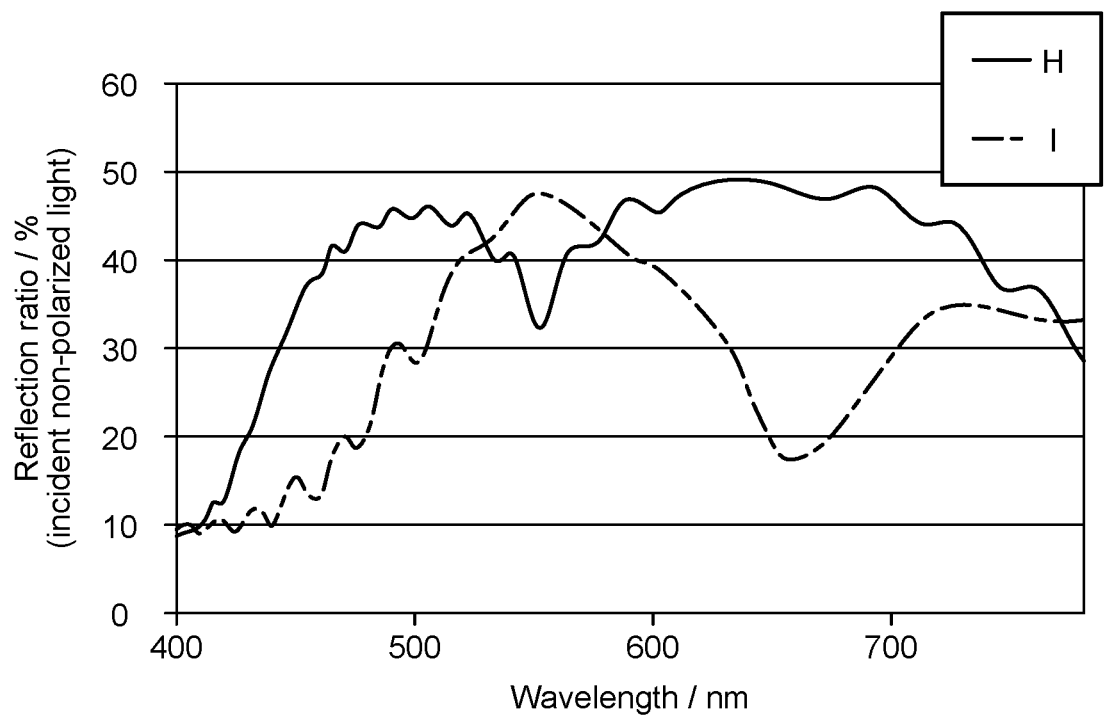
FIG. 23 is a graph illustrating measurement results of a reflection ratio in a wavelength range of 400 nm to 780 nm of cholesteric resin layers H and I prepared in Examples.

FIG. 20 is a graph illustrating measurement results of a reflection ratio in a wavelength range of 400 nm to 780 nm of the cholesteric resin layers A, B and C. FIG. 21 is a graph illustrating measurement results of a reflection ratio in a wavelength range of 400 nm to 780 nm of the cholesteric resin layers D and E. FIG. 22 is a graph illustrating measurement results of a reflection ratio in a wavelength range of 400 nm to 780 nm of the cholesteric resin layers F and G. FIG. 23 is a graph illustrating measurement results of a reflection ratio in a wavelength range of 400 nm to 780 nm of the cholesteric resin layers H and I prepared in Examples. In each graph, the horizontal axis is the wavelength (nm), and the vertical axis is the reflection ratio (%).

Since each measurement value involves an interface reflection component (7% in the cholesteric resin layers A to I), a value obtained by subtracting the interface reflection component from each measurement value was adopted as a reflection ratio ($Rs(\lambda)$, $Rf_2(\lambda)$, and $Rf_3(\lambda)$).

The $S_2$ value, the $S_3$ value, the $Ssf_2$ value, and the $Ssf_3$ value were calculated as an approximate value of an integrated value by the following formulae (7) to (10). For the calculation of the $S_2$ value, the $S_3$ value, the $Ssf_2$ value, and the $Ssf_3$ value, reflection ratios to wavelengths at every 5 nm in the wavelength range of 400 nm to 780 nm was used.

$$S_2 = \Sigma\{(Rf_2(\lambda))*(Rf_2(\lambda))\}^{(1/2)} \cdot 5 \tag{7}$$

$\lambda = 400\sim780$(5 nm steps)

$$Ssf_2 = \Sigma\{(Rs(\lambda))*Rf_2(\lambda))\}^{(1/2)} \cdot 5 \tag{8}$$

$\lambda = 400\sim780$(5 nm steps)

$$S_3 = \Sigma\{(Rf_3(\lambda))*(Rf_3(\lambda))\}^{(1/2)} \cdot 5 \tag{9}$$

$\lambda = 400\sim780$(5 nm steps)

$$Ssf_3 = \Sigma\{(Rs(\lambda))*(Rf_3(\lambda))\}^{(1/2)} \cdot 5 \tag{10}$$

$\lambda = 400\sim780$(5 nm steps)

2. Production of Paint Using Flakes (Production of Peel Piece)

Figure 24:
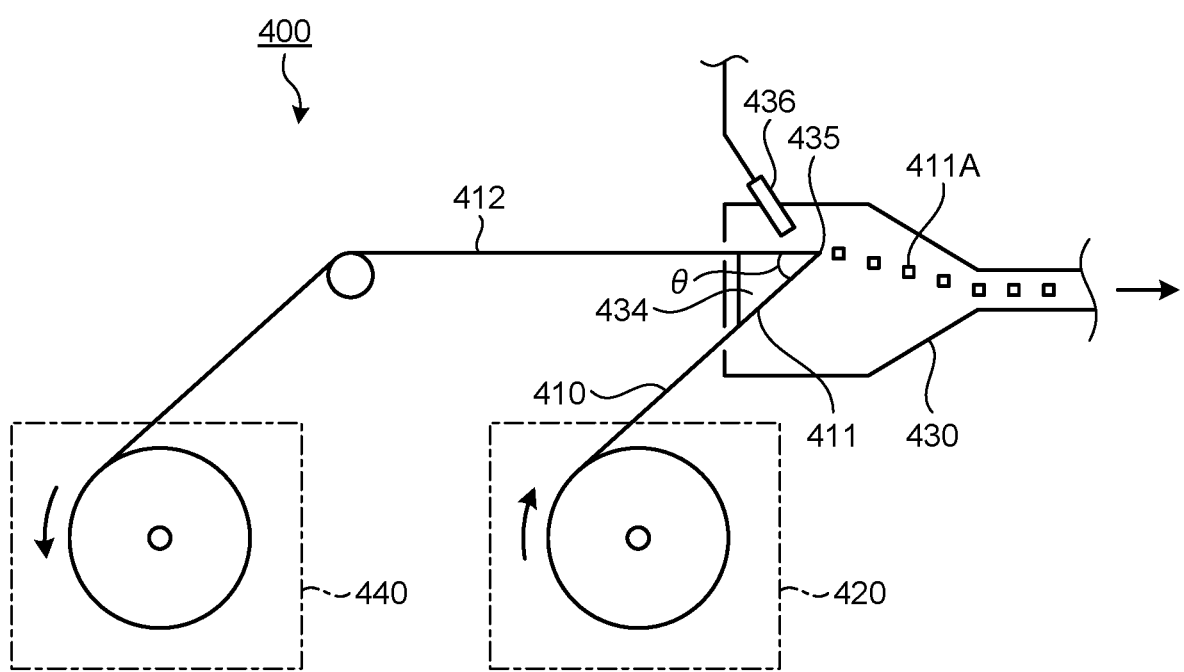
FIG. 24 is a side view schematically illustrating an apparatus for producing a peel piece used when producing a peel piece (flake) of a cholesteric resin layer in Examples.

With the multilayer films including the cholesteric resin layers A to I obtained in 1., peel pieces A to I of the cholesteric resin layers were prepared, respectively. As an apparatus for producing a peel piece, an apparatus illustrated in FIG. 24 was used. FIG. 24 is a side view schematically illustrating an apparatus for producing a peel piece of the cholesteric resin layer.

A production apparatus 400 including, as illustrated in FIG. 24, a film delivering unit 420, a peel unit 430, and a film recovering unit 440 was prepared. The peel unit 430 included a bar 434 that has a corner 435 formed at an acute angle and a nozzle 436 that is disposed immediately downstream of the corner 435 and that is capable of ejecting air. The angle of the corner 435 of the bar 434 was set such that a multilayer film 410 can be folded over at an angle θ (45°). The corner has a chamfered structure of R=0.2 mm to 0.3 mm.

The multilayer film 410 was placed on the film delivering unit 420 in such an orientation that a cholesteric resin layer 411 came outside than a PET film 412 at the corner 435 of the bar 434 when the multilayer film 410 was folded over. Then, the multilayer film 410 was delivered from the film delivering unit 420 in a state in which tension in the delivery direction was applied to the multilayer film 410 by the film recovering unit 440. The amount of the tension applied to the multilayer film 410 was set to 80 N/m. Air was ejected from the nozzle 436 at a pressure of 0.5 MPa.

The multilayer film 410 was folded over at the corner 435 of the bar 434, which caused the formation of many cracks. After that, the cholesteric resin layer 411 in which cracks were formed by air ejected from the nozzle 436 was peeled and blown off, and a peel piece 411A was obtained. The obtained peel piece 411A was recovered by a recovery device.

(Production of Flakes)

The recovered peel pieces A to I of the cholesteric resin layers were pulverized using a stone mill type pulverizer ("micro powder MPW-G008" manufactured by WEST) to obtain flakes A to I. The average particle diameter of the obtained flakes was 50 μm.

(Production of Paint)

Using the flakes A to I thus obtained as a cholesteric resin layer pigment, paints A to I were produced by the following method. The paint was produced by mixing 100 parts by weight of a screen ink ("No. 2500 medium" manufactured by Jujo Chemical Co., Ltd.) as a binder solution, 10 parts by weight of a diluent exclusive for the screen ink (Tetron standard solvent), and 15 parts by weight of the flakes.

3. Production of Identification Medium

With the multilayer film including the cholesteric resin layer obtained in 1. and the paint containing the flakes obtained in 2., an identification medium of each of Examples 1 to 18 and Comparative Examples 1 to 12 was produced. The total light reflection ratio was measured, and the visual recognizability was evaluated.

(Evaluation of Transparency of Identification Medium)

The identification medium of each example was placed on a printed surface of a paper on which a picture had been printed. Then, whether or not the picture printed on the paper can be visually confirmed through the identification medium was observed. When the picture can be observed by visual inspection, it was determined that the identification medium is transparent or translucent. When the picture cannot be observed, it was determined that the identification medium is opaque. The results are shown in Table 3 and Table 4. In Tables 3 and 4, "A" indicates a case of transparent or translucent, and "B" indicates a case of opaque.

(Method for Evaluating Visual Recognizability of Identification Medium)

The identification medium of each example was placed on a white paper. Whether or not characters printed with the paint containing the flakes can be visually recognized by the naked eye was observed under a white fluorescent lamp. The evaluation was performed in accordance with the following evaluation criteria. The results are shown in Tables 3 and 4.

In Table 3 and Table 4, "Observed from second layer side" means a case where the identification medium was placed on a paper such that the second layer was on the upper side and then observed while being irradiated with light from the upper side. In Table 3 and Table 4, "Observed from first layer or third layer side" means a case where, as to the identification medium including the third layer, the medium was placed on a paper such that the third layer side was on the upper side, or, as to the identification medium including no third layer, the medium was placed on a paper such that the first layer (substrate layer) side was on the upper side, and then the medium was observed while being irradiated with light from the upper side.

In Examples and Comparative Examples, an identification medium of which only one surface was subjected to a print treatment with a paint containing flakes (type 1: identification medium including no third layer) and an identification medium of which both surfaces were subjected to a print treatment with a paint containing flakes (type 2: identification medium including the third layer) were produced and evaluated. Therefore, evaluation methods and evaluation criteria will be described for each type of identification medium.

(Method for Evaluating Identification Medium of Type 1)

The identification medium of type 1 has a structure in which the second layer (layer containing flakes), the first layer, the tackiness agent, and the substrate layer (vinyl chloride sheet) are layered in this order.

Whether or not characters printed on the second layer can be visually recognized by the naked eye was observed for a case where the identification medium was placed on a white paper such that the second layer was on the upper side and a case where the identification medium was placed on a white paper such that the first layer (substrate layer) side was on the upper side. The evaluation criteria are as follows.

Good: The characters on the second layer can be visually recognized when observed from the second layer side but cannot be visually recognized when observed from the first layer side.

Poor: The characters on the second layer can be visually recognized when observed from the second layer side, and the characters on the second layer can be visually recognized when observed from the first layer side.

If the characters printed on the second layer can be visually recognized only when observed from the second layer side, the identification medium is a medium authenticity of which can be clearly determined.

(Identification Medium of Type 2)

The identification medium of type 2 has a structure in which the second layer (layer containing flakes), the first layer, the tackiness agent, the substrate layer (vinyl chloride sheet), and the third layer (layer containing flakes) are layered in this order.

Whether or not characters printed on the second layer and characters printed on the third layer can be visually recognized were observed for a case where the identification medium was placed on a white paper such that the second layer was on the upper side and for a case where the identification medium was placed on a white paper such that the third layer was on the upper side. The evaluation criteria are as follows.

Good: Only the characters on the second layer can be visually recognized when observed from the second layer side, but the characters on the second layer cannot be visually recognized when observed from the third layer side.

Poor: The characters on the second layer can be visually recognized when observed from the second layer side, and the characters on the second layer can be visually recognized when observed from the third layer side.

If the characters printed on the second layer can be visually recognized only when observed from the second layer side, the authenticity can be clearly identified. If only the characters printed on the second layer can be visually recognized when observed from the second layer side, and only the characters printed on the third layer can be visually recognized when observed from the third layer side, the authenticity can be further clearly identified.

(Method for Calculating Hue Difference ΔE')

For the identification medium on which the second layer and the third layer were formed, the difference ΔE' between the hue of the second layer and the hue of the third layer was calculated by the following method. The results are shown in Tables 3 and 4.

The reflection spectra of the second layer and the third layer of the identification medium were measured with a spectrophotometer ("UV-Vis550" manufactured by JASCO Corporation). The measurement was performed at a viewing angle of 2° using a C light source.

Using the measured reflection spectrum R(λ), the tristimulus values X, Y, and Z were obtained (STEP. 1), and the lightness L*, a*, b* of the CIE 1976 L*a*b* color space was calculated (STEP. 2). Then, ΔE' was calculated using the obtained L*, a*, and b* for each layer (STEP. 3). Each STEP will be described.

(Step. 1)

The tristimulus values X, Y, and Z were calculated using the measured reflection spectrum R(λ) and the following formulae (11) to (13).

$$X = \sum_{n=0}^{80} S(380 + 5n) * R(380 + 5n) * x(380 + 5n) \quad (11)$$

$$Y = \sum_{n=0}^{80} S(380 + 5n) * R(380 + 5n) * y(380 + 5n) \quad (12)$$

$$Z = \sum_{n=0}^{80} S(380 + 5n) * R(380 + 5n) * z(380 + 5n) \quad (13)$$

Herein, S(λ) is the spectrum of the light source, and the value of the C light source was used in this embodiment. Further, x(λ), y(λ), and z(λ) represent color-matching functions.

(Step. 2)

Using the tristimulus values X, Y, and Z calculated in STEP. 1, the lightness L*, a*, and b* of the CIE 1976 L*a*b* color space were calculated. The following formulae (14) to (16) were used for the calculation.

$$L^* = 116\left(\frac{Y}{Y_n}\right)^{1/3} - 16 \quad (14)$$

$$a^* = 500\left\{f\left(\frac{X}{X_n}\right) - f\left(\frac{Y}{Y_n}\right)\right\} \quad (15)$$

$$b^* = 200\left\{f\left(\frac{Y}{Y_n}\right) - f\left(\frac{Z}{Z_n}\right)\right\} \quad (16)$$

Herein, $X_n$, $Y_n$, and $Z_n$ are tristimulus values calculated by the following formulae (17) to (19), respectively.

$$X_n = \sum_{n=0}^{80} S(380 + 5n) * x(380 + 5n) \quad (17)$$

$$Y_n = \sum_{n=0}^{80} S(380 + 5n) * y(380 + 5n) \quad (18)$$

$$Z_n = \sum_{n=0}^{80} S(380 + 5n) * z(380 + 5n) \quad (19)$$

Further, $f(X/X_n)$, $f(Y/Y_n)$, and $f(Z/Z_n)$ are represented by the formulae (20) to (22), respectively.

$$f\left(\frac{X}{X_n}\right) = \left(\frac{X}{X_n}\right)^{1/3} \quad \frac{X}{X_n} > 0.008856 \quad (20)$$

$$f\left(\frac{X}{X_n}\right) = 7.787\left(\frac{X}{X_n}\right) + \frac{16}{116} \quad \frac{X}{X_n} \leq 0.008856$$

$$f\left(\frac{Y}{Y_n}\right) = \left(\frac{Y}{Y_n}\right)^{1/3} \quad \frac{Y}{Y_n} > 0.008856 \quad (21)$$

$$f\left(\frac{Y}{Y_n}\right) = 7.787\left(\frac{Y}{Y_n}\right) + \frac{16}{116} \quad \frac{Y}{Y_n} \leq 0.008856$$

$$f\left(\frac{Z}{Z_n}\right) = \left(\frac{Z}{Z_n}\right)^{1/3} \quad \frac{Z}{Z_n} > 0.008856 \quad (22)$$

$$f\left(\frac{Z}{Z_n}\right) = 7.787\left(\frac{Z}{Z_n}\right) + \frac{16}{116} \quad \frac{Z}{Z_n} \leq 0.008856$$

(Step. 3)

ΔE' was calculated from the obtained values of L*, a*, and b* of each layer using the formula (23).

$$\Delta E^* = ((L^*_2 - L^*_3) + (a^*_2 - a^*_3) + (b^*_2 - b^*_3))^{1/2} \quad \text{formula (23)}$$

In the formula (23), $L^*_2$ is L* of the second layer, $L^*_3$ is L* of the third layer, $a^*_2$ is a* of the second layer, $a^*_3$ is a* of the third layer, $b^*_2$ is b* of the second layer, and $b^*_3$ is b* of the third layer.

Example 1

From the multilayer film including the cholesteric resin layer F, the cholesteric resin layer F is transferred onto a vinyl chloride sheet via a tackiness agent, and the PET film was peeled to obtain a layered body X having a structure in which the cholesteric resin layer F, the tackiness agent, and the vinyl chloride sheet are layered in this order.

As the tackiness agent, a transparent tackiness tape (LUCIACS CS9621T, thickness: 25 μm, visible light transmission: 90% or more, retardation 3 nm or less) manufactured by Nitto Denko Corporation was used. As the vinyl chloride sheet, part No. 6-607-01 (thickness 100 μm, visible light transmission: 85% or more, retardation 3 nm or less) manufactured by AS One Corporation was used.

Screen printing was performed to one surface (a surface on the cholesteric resin layer F side) of the layered body X with the paint containing flakes A. As a plate for screen printing, a 100 mesh screen with a character pattern was prepared. As the characters, characters "ABCD" were printed as illustrated in FIG. 1 and FIG. 2.

After the printing, a layered body X1 in which the paint containing the flakes A, the cholesteric resin layer F, the tackiness agent, and the vinyl chloride sheet were layered in this order was obtained. The layered body X1 was heated on a hot plate at 80° C. for 10 minutes to dry the paint. Accordingly, an identification medium was obtained. This identification medium corresponds to the identification medium of Embodiment 1. The identification medium has a structure in which, as illustrated in FIG. 3, the second layer 12, the first layer 11 (cholesteric resin layer F), the tackiness agent 15, and the vinyl chloride sheet 14 are layered in this order. The second layer 12 is a layer of the printed characters "ABCD". The identification medium was translucent. The obtained identification medium was evaluated. As a result, the characters of the second layer were visually recognizable when observed from the second layer side but were not visually recognizable when observed from the vinyl chloride sheet side.

Examples 2 to 9

An identification medium was obtained by the same operation as that of Example 1 except that the paint containing flakes (flakes B to I) described in the "Second layer" in the "Structure" column of Table 3 was used instead of the paint containing the flakes A. All of these identification media correspond to the identification medium of the first embodiment. All the identification media were translucent. When each of the obtained identification media was evaluated, the characters of the second layer were visually recognizable when observed from the second layer side but the characters of the second layer were not visually recognizable when observed from the vinyl chloride sheet side.

(Identification Medium of Example 10)

With the paint containing the flakes, screen printing was performed to both surfaces of the layered body X prepared in Example 1, which had a structure in which the cholesteric resin layer F, the tackiness agent, and the vinyl chloride sheet were layered in this order. With the paint containing the flakes A, screen printing was performed to a surface of the layered body X on the cholesteric resin layer F side. Also, with the paint containing the flakes C, screen printing was performed to a surface of the layered body X on the vinyl chloride sheet side. As a plate for screen printing, a 100 mesh screen with a character pattern was prepared. As the characters, characters "ABCD" were printed on the surface on the cholesteric resin layer F (first layer) side, and characters "EFG" were printed on the surface on the vinyl chloride sheet side, as illustrated in FIG. 10 to FIG. 12.

After the printing, a layered body X10 in which the paint containing the flakes A, the cholesteric resin layer F, the tackiness agent, the vinyl chloride sheet, and the paint containing the flakes C are layered in this order was obtained. The layered body X10 was heated on a hot plate at 80° C. for 10 minutes to dry the paint. Accordingly, an identification medium was obtained. This identification medium corresponds to the identification medium of Embodiment 2. The identification medium had a structure in which, as illustrated in FIG. 13, the second layer 112, the first layer 111 (cholesteric resin layer F), the tackiness agent 115, the vinyl chloride sheet 114, and the third layer 113 were layered in this order. The second layer 112 is a layer of the printed characters "ABCD", and the third layer 113 is a layer of the printed characters "EFG". The identification medium was translucent. The obtained identification medium was evaluated. The result was as follows. When observed from the second layer side, the characters of the second layer were visually recognizable, but the characters of the third layer were not visually recognizable. When observed from the third layer side, the characters of the third layer were visually recognizable, but the characters of the second layer were not visually recognizable.

(Identification Medium of Example 11)

An identification medium was obtained by the same operation as that of Example 1 except that the multilayer film including the cholesteric resin layer I was used instead of the multilayer film including the cholesteric resin layer F. This identification medium corresponds to the identification medium of the first embodiment. The identification medium was translucent. When the obtained identification medium was evaluated, the characters of the second layer were visually recognizable when observed from the second layer side, and the characters of the second layer were not visually recognizable when observed from the vinyl chloride sheet side.

(Identification Media of Examples 12 to 15)

An identification medium was obtained by the same operation as that of Example 1 except that the multilayer film including the cholesteric resin layer I was used instead of the multilayer film including the cholesteric resin layer F, and a paint containing flakes (flakes D, E, H, or I) described in "Second layer" in the column of "Structure" in Table 3 and Table 4 was used instead of the paint containing the flakes A. These identification media correspond to the identification medium of the first embodiment. The identification media were translucent. When the obtained identification media were evaluated, the characters of the second layer were visually recognizable when observed from the second layer side, and the characters of the second layer were not visually recognizable when observed from the vinyl chloride sheet side.

(Identification Medium of Example 16)

With the paint containing the flakes, screen printing was performed to both surfaces of a layered body Y having a structure in which the cholesteric resin layer I, a tackiness agent, and a vinyl chloride sheet were layered in this order. With the paint containing the flakes D, screen printing was performed to a surface of the layered body Y at the cholesteric resin layer I side. Also, with the paint containing the flakes B, screen printing was performed to a surface of the layered body Y at the vinyl chloride sheet side. As a plate for screen printing, a 100 mesh screen with a character pattern was prepared. As the characters, characters "ABCD" were printed on a surface on the cholesteric resin layer I (first layer) side, and characters "EFG" were printed on a surface on the vinyl chloride sheet side, as illustrated in FIG. 10 to FIG. 12.

After the printing, a layered body Y1 in which the paint containing the flakes D, the cholesteric resin layer I, the tackiness agent, the vinyl chloride sheet, and the paint containing the flakes B were layered in this order was obtained. The layered body Y1 was heated on a hot plate at 80° C. for 10 minutes to dry the paint. Accordingly, an identification medium was obtained. The identification medium had a structure in which the second layer, the first layer (cholesteric resin layer I), the tackiness agent, the vinyl chloride sheet, and a third layer were layered in this order. The second layer was a layer of the printed characters "ABCD", and the third layer was a layer of the printed characters "EFG". The identification medium was translucent.

The obtained identification medium was evaluated. As a result, when observed from the second layer side, both the characters of the second layer and the characters of the third layer were visually recognizable. When observed from the third layer side, the characters of the third layer were visually recognizable, but the characters of the second layer not visually recognizable.

(Identification Medium of Example 17)

An identification medium was obtained by the same operation as that of Example 1 except that the multilayer film including the cholesteric resin layer D was used instead of the multilayer film including the cholesteric resin layer F. This identification medium corresponds to the identification medium of the first embodiment. The identification medium was translucent. When the obtained identification medium was evaluated, the characters of the second layer were visually recognizable when observed from the second layer side, and the characters of the second layer were not visually recognizable when observed from the vinyl chloride sheet side.

(Identification Medium of Example 18)

An identification medium was obtained by the same operation as that of Example 1 except that the multilayer film including the cholesteric resin layer D was used instead of the multilayer film including the cholesteric resin layer F, and the paint containing the flakes D was used instead of the paint containing the flakes A. This identification medium corresponds to the identification medium of the first embodiment. The identification medium was translucent. When the obtained identification medium was evaluated, the characters of the second layer were visually recognizable when observed from the second layer side, and the characters of the second layer were not visually recognizable when observed from the vinyl chloride sheet side.

(Identification Media of Comparative Examples 1 to 4)

An identification medium was obtained by the same operation as that of Example 1 except that the multilayer film including the cholesteric resin layer I was used instead of the multilayer film including the cholesteric resin layer F, and a paint containing flakes (flakes B, C, F, or G) described in "Second layer" of the column "Structure" in Table 3 and Table 4 was used instead of the paint containing the flakes A. Each of the identification media has a structure in which the second layer, the first layer (cholesteric resin layer), the tackiness agent, and the vinyl chloride sheet were layered in this order. However, the value of $Ssf_2/S$ was 0.7 or less. The identification medium was translucent.

The obtained identification media were evaluated. As a result, in all the identification media, the characters of the second layer were visually recognizable from surfaces on both sides (the second layer side and the vinyl chloride sheet side).

(Identification Media of Comparative Examples 5 to 11)

An identification medium was obtained by the same operation as that of Example 1 except that the multilayer film including the cholesteric resin layer D was used instead of the multilayer film including the cholesteric resin layer F, and a paint containing flakes (flakes B, C, or E to I) described in "Second layer" in the column of "Structure" in Table 4 was used instead of the paint containing the flakes A. Each identification medium had a structure in which the second layer, the first layer (cholesteric resin layer), the tackiness agent, and the vinyl chloride sheet were layered in this order, but the $Ssf_2/S$ value was 0.7 or less. The identification medium was translucent.

When each of the obtained identification media was evaluated, the characters of the second layer were visually recognizable from surfaces on both sides (second layer side and vinyl chloride sheet side) in any of the identification media.

(Identification Medium of Comparative Example 12)

Screen printing was performed using a paint containing flakes on both sides of the layered body C5 having a structure in which the cholesteric resin layer D, the tackiness agent, and the vinyl chloride sheet of Comparative Example 5 were layered in this order. Screen printing was performed on the surface of the layered body C5 on the cholesteric resin layer D side using the paint containing the flakes B, and screen printing was performed on the surface of the layered body C5 on the vinyl chloride sheet side using the paint containing the flakes C. As a plate for screen printing, a 100 mesh screen with a character pattern was prepared. As the characters, characters "ABCD" were printed on a surface on the cholesteric resin layer I (first layer) side, and characters "EFG" were printed on a surface on the vinyl chloride sheet side, as illustrated in FIG. 10 to FIG. 12.

After the printing, a layered body C12 in which the paint containing the flakes B, the cholesteric resin layer D, the tackiness agent, the vinyl chloride sheet, and the paint containing the flakes C were layered in this order was obtained. The layered body C121 was heated on a hot plate at 80° C. for 10 minutes to dry the paint. Accordingly, an identification medium was obtained. The identification medium had a structure in which the second layer, the first layer (cholesteric resin layer D), the tackiness agent, the vinyl chloride sheet, and a third layer were layered in this order. The second layer was a layer of the printed characters "ABCD", and the third layer was a layer of the printed characters "EFG". However, the value of $Ssf_2/S$ and the value of $Ssf_3/S$ were both 0.7 or less. The identification medium was translucent.

When the obtained identification medium was evaluated, the characters of the second layer and the characters of the third layer were visually recognizable when observed from the second layer side. When observed from the third layer side, the characters of the second layer and the characters of the third layer were visually recognizable.

TABLE 3

| | Structure | | | | | | | Observation from second layer side | | Observation from first or third layer side | | |
|---|---|---|---|---|---|---|---|---|---|---|---|---|
| | Second layer | First layer | Third layer | ΔE* | Transparency | $Ssf_2/S_2$ | $Ssf_3/S_3$ | Second layer | Third layer | Second layer | Third layer | Evaluation result |
| Ex. 1 | A | F | — | | A | 1.01 | | Visible | — | Not visible | — | Good |
| Ex. 2 | B | F | — | | A | 1.01 | | Visible | — | Not visible | — | Good |
| Ex. 3 | C | F | — | | A | 1.03 | | Visible | — | Not visible | — | Good |
| Ex. 4 | D | F | — | | A | 1.02 | | Visible | — | Not visible | — | Good |
| Ex. 5 | E | F | — | | A | 1.05 | | Visible | — | Not visible | — | Good |
| Ex. 6 | F | F | — | | A | 1.00 | | Visible | — | Not visible | — | Good |
| Ex. 7 | G | F | — | | A | 1.12 | | Visible | — | Not visible | — | Good |
| Ex. 8 | H | F | — | | A | 1.04 | | Visible | — | Not visible | — | Good |
| Ex. 9 | I | F | — | | A | 1.14 | | Visible | — | Not visible | — | Good |
| Ex. 10 | A | F | C | 85.5 | A | 1.01 | 1.03 | Visible | Not visible | Not visible | Visible | Good |
| Ex. 11 | A | I | — | | A | 0.99 | | Visible | — | Not visible | — | Good |
| Comp. Ex. 1 | B | I | — | | A | 0.22 | | Visible | — | Visible | — | Poor |
| Comp Ex. 2 | C | I | — | | A | 0.66 | | Visible | — | Visible | — | Poor |
| Ex. 12 | D | I | — | | A | 0.96 | | Visible | — | Not visible | — | Good |
| Ex. 13 | E | I | — | | A | 0.77 | | Visible | — | Not visible | — | Good |

TABLE 4

| | Structure | | | | | | | Observation from second layer side | | Observation from first or third layer side | | |
|---|---|---|---|---|---|---|---|---|---|---|---|---|
| | Second layer | First layer | Third layer | ΔE* | Transparency | Ssf$_2$/S$_2$ | Ssf$_3$/S$_3$ | Second layer | Third layer | Second layer | Third layer | Evaluation result |
| Comp. Ex. 3 | F | I | — | | A | 0.64 | | Visible | — | Visible | — | Poor |
| Comp. Ex. 4 | G | I | — | | A | 0.69 | | Visible | — | Visible | — | Poor |
| Ex. 14 | H | I | — | | A | 0.73 | | Visible | — | Not visible | — | Good |
| Ex. 15 | I | I | — | | A | 1.00 | | Visible | — | Not visible | — | Good |
| Ex. 16 | D | I | B | 127.9 | A | 0.96 | 0.22 | Visible | Visible | Not visible | Visible | Good |
| Ex. 17 | A | D | — | | A | 1.04 | | Visible | — | Not visible | — | Good |
| Comp. Ex. 5 | B | D | — | | A | 0.03 | | Visible | — | Visible | — | Poor |
| Comp. Ex. 6 | C | D | — | | A | 0.14 | | Visible | — | Visible | — | Poor |
| Ex. 18 | D | D | — | | A | 1.00 | | Visible | — | Not visible | — | Good |
| Comp. Ex. 7 | E | D | — | | A | 0.47 | | Visible | — | Visible | — | Poor |
| Comp. Ex. 8 | F | D | — | | A | 0.29 | | Visible | — | Visible | — | Poor |
| Comp. Ex. 9 | G | D | — | | A | 0.32 | | Visible | — | Visible | — | Poor |
| Comp. Ex. 10 | H | D | — | | A | 0.33 | | Visible | — | Visible | — | Poor |
| Comp. Ex. 11 | I | D | — | | A | 0.49 | | Visible | — | Visible | — | Poor |
| Comp. Ex. 12 | B | D | C | 85.4 | A | 0.03 | 0.14 | Visible | Visible | Visible | Visible | Poor |

[Results]

As illustrated in Table 3 and 4, it was confirmed that in Examples 1 to 18 of the present invention, the information of the second layer can be visually recognized from the second layer side but cannot be visually recognized from the opposite side (the first layer side or the third layer side). It was also confirmed that in Examples of the present invention, authenticity can be determined by the naked eye without using a special viewer.

REFERENCE SIGN LIST 10, 100h identification medium
11, 111 first layer
12, 112 second layer
12F, 112F, 113F flake
14, 114 substrate layer
15, 115 tackiness layer
20, 200 booklet (article)
21, 201 n'th leaf of booklet (portion including identification medium)
21A, 201A surface to be stacked on the "n−1"th leaf
21B, 201B surface to be stacked on the "n+1"th leaf
22, 202 "n+1"th leaf of booklet (base)
22A, 23A, 202A, 203A area on which identification medium is stacked (area on which information is printed)
23, 203 "n−1"th leaf of booklet (base)
113 third layer
400 apparatus for producing peel piece of cholesteric resin layer
410 multi-layer film
411 cholesteric resin layer
412 support body (PET film)
411A peel piece
420 film delivering unit
430 peel unit
434 bar
435 corner of bar
436 nozzle
440 film recovering unit

The invention claimed is:

1. An identification medium comprising a first layer, and a second layer disposed thereon in a manner of overlapping with the first layer, wherein
the first layer is a layer that is capable of reflecting one of clockwise circular polarized light and counterclockwise circular polarized light and allowing to pass therethrough the remaining circular polarized light and the first layer is transparent,
the second layer is a layer that is capable of reflecting at least a portion of circular polarized light having the same rotation direction as that of the circular polarized light that the first layer reflects, and allowing to pass therethrough circular polarized light having an opposite rotation direction to that of the circular polarized light reflected by the first layer, and the second layer is formed as a pattern on the first layer, and the entire region of the second layer overlaps with the first layer, and
a ratio (Ssf$_2$/S$_2$) of Ssf$_2$ defined by the following formula (2) relative to S$_2$ defined by the following formula (1) is more than 0.7:

$$S_2 = \int_{400}^{780} \{(Rf_2(\lambda)) * (Rf_2(\lambda))\}^{\wedge}(1/2) \cdot d\lambda \quad (1)$$

(in the formula, λ represents a wavelength (nm), and $Rf_2(\lambda)$ represents a reflection ratio at a wavelength λ of the second layer)

$$Ssf_2 = \int_{400}^{780} \{(Rs(\lambda)) * (Rf_2(\lambda))\}^{\wedge}(1/2) \cdot d\lambda \quad (2)$$

(in the formula, $Rs(\lambda)$ represents a reflection ratio at a wavelength λ of the first layer).

2. The identification medium according to claim 1, wherein
the first layer is a layer of a resin having cholesteric regularity,
the second layer contains a flake of a resin having cholesteric regularity, and
the identification medium is transparent or translucent.

3. The identification medium according to claim 1, comprising a third layer disposed on the first layer on a surface opposite to a surface on which the second layer is disposed, such that the third layer overlaps with the first layer,
the third layer is a layer that is capable of allowing to pass therethrough circular polarized light having an opposite rotation direction to that of the circular polarized light that the first layer reflects, and that contains a flake of a resin having cholesteric regularity, and the third layer is formed as a pattern on the first layer, and the third layer and the entire region of the third layer overlaps with the first layer.

4. The identification medium according to claim 3, wherein a ratio ($Ssf_3/S_3$) of $Ssf_3$ defined by the following formula (4) relative to $S_3$ defined by the following formula (3) is more than 0.7:

$$S_3 = \int_{400}^{780} \{(Rf_3(\lambda)) * (Rf_3(\lambda))\}^{\wedge}(1/2) \cdot d\lambda \quad (3)$$

(in the formula, $Rf_3(\lambda)$ represents a reflection ratio at a wavelength λ of the third layer)

$$Ssf_3 = \int_{400}^{780} \{(Rs(\lambda)) * (Rf_3(\lambda))\}^{\wedge}(1/2) \cdot d\lambda. \quad (4)$$

5. The identification medium according to claim 3, wherein
a wavelength of reflected light by the second layer and a wavelength of reflected light by the third layer each fall within a visible light region, and
a difference ΔF* between a hue by the reflected light by the second layer and a hue by the reflected light by the third layer is 10 or more.

6. A method for determining authenticity of the identification medium according to claim 3, comprising:
a third step of observing, from a second layer side of the identification medium, reflected light of light for irradiation of the identification medium from the second layer side and determining whether or not information by the second layer and information by the third layer can be visually recognized; and
a fourth step of observing, from a third layer side, reflected light of light for irradiation of the identification medium from the third layer side and determining whether or not the information by the second layer and the information by the third layer can be visually recognized.

7. The identification medium according to claim 1, wherein a reflection ratio relative to incident non-polarized light of the first layer is 35% or more and 50% or less at all wavelengths in a wavelength region of 420 nm to 650 nm.

8. A method for determining authenticity of the identification medium according to claim 1, comprising:
a first step of observing, from a second layer side of the identification medium, reflected light of light for irradiation of the identification medium from the second layer side and determining whether or not information by the second layer can be visually recognized; and
a second step of observing, from a side that is opposite to the second layer side, reflected light of light for irradiation of the identification medium from the side that is opposite to the second layer side and determining whether or not the information by the second layer can be visually recognized.

9. An article comprising the identification medium according to claim 1.

10. The identification medium according to claim 1, wherein the ratio ($Ssf_2/S_2$) is 1.0 or more.

* * * * *